(12) United States Patent
Kano et al.

(10) Patent No.: US 6,453,349 B1
(45) Date of Patent: Sep. 17, 2002

(54) APPARATUS AND METHOD FOR RESOURCE RESERVATION IN A NETWORK SYSTEM

(75) Inventors: Shinya Kano; Akira Chugo, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/212,636

(22) Filed: Dec. 16, 1998

(30) Foreign Application Priority Data

Jul. 14, 1998 (JP) ............................................ 10-199273

(51) Int. Cl.[7] ............................................ G06F 15/173
(52) U.S. Cl. ...................... 709/226; 709/204; 709/205; 709/223; 709/224; 709/238; 370/356; 370/340; 370/400
(58) Field of Search ........................ 704/200, 204–205, 704/217–219, 223–226, 238–242, 245–246; 370/351, 355–356, 389–390, 342, 395–397, 400–401, 409, 231–233

(56) References Cited

U.S. PATENT DOCUMENTS

| | | | | |
|---|---|---|---|---|
| 5,481,726 A | * | 1/1996 | Kumaki et al. ............. | 709/226 |
| 5,629,942 A | * | 5/1997 | Zijderhand .................. | 370/461 |
| 5,745,694 A | * | 4/1998 | Egawa et al. ............... | 709/226 |
| 5,884,036 A | * | 3/1999 | Haley ......................... | 709/224 |
| 5,903,735 A | * | 5/1999 | Kidder et al. .............. | 709/240 |
| 5,991,811 A | * | 11/1999 | Ueno et al. ................. | 709/219 |
| 6,023,728 A | * | 2/2000 | Tanaka ........................ | 709/225 |
| 6,041,359 A | * | 3/2000 | Birdwell ..................... | 709/238 |
| 6,058,113 A | * | 5/2000 | Chang ......................... | 370/390 |
| 6,094,431 A | * | 7/2000 | Yamato et al. .............. | 370/395 |
| 6,101,549 A | * | 8/2000 | Baugher et al. ............ | 709/238 |
| 6,118,762 A | * | 9/2000 | Nomura et al. ............. | 370/230 |
| 6,167,051 A | * | 12/2000 | Nagami et al. ............. | 370/397 |
| 6,205,484 B1 | * | 3/2001 | Eriksson ..................... | 709/226 |
| 6,226,263 B1 | * | 5/2001 | Iwase et al. ................ | 370/231 |
| 6,278,712 B1 | * | 8/2001 | Takihiro et al. ............ | 370/400 |

* cited by examiner

*Primary Examiner*—Bharat Barot
(74) *Attorney, Agent, or Firm*—Katten Muchin Zavis Rosenman

(57) ABSTRACT

A network system comprising terminals and relaying nodes having a reservation message processing unit for transferring a packet wherein a packet receiving terminal 3 requests a reservation of network resources. The packet receiving terminal 3 transmits to a packet transmitting terminal 1 a request message in which a reservation request condition is stored in order to request a resource reservation, the packet transmitting terminal 1 having received the request message transmits to the relaying node 2 on the same route as the packet an acknowledgement message in which the reservation request condition is stored. Each relaying node 2 provides a resource reservation for the home relaying node according to the reservation request condition in the acknowledgement message and transfers the acknowledgement message to the same route as the packet. After the acknowledgement message has passed through all the relaying node 2, and when the packet receiving terminal has received the acknowledgement message, a network resource reservation procedure is completed.

17 Claims, 19 Drawing Sheets

(MESSAGE TYPE = ACKNOWLEDGEMENT
FLAG = FLAG1 : RESERVATION REFUSAL FLAG
       FLAG2 : RESERVATION VALUE MODIFICATION FLAG
       FLAG3 : COMPLETION NOTIFICATION REQUEST FLAG)

(MESSAGE TYPE = ERROR
FLAG = FLAG1 : COMPLETION NOTIFICATION REQUEST FLAG)

(MESSAGE TYPE = RESERVATION KEEP
FLAG : NONE)

(MESSAGE TYPE = RESERVED RESOURCE RELEASE
FLAG : NONE)

(MESSAGE TYPE = RESERVATION COMPLETION NOTIFICATION
FLAG = FLAG1 : RESERVATION COMPLETION FLAG)

dst_ip : DESTINATION IP ADDRESS
src_ip : SOURCE IP ADDRESS
R.R.VALUE : RESOURCE RESERVATION VALUE

APPARATUS AND METHOD FOR RESOURCE RESERVATION IN A NETWORK SYSTEM

BACKGROUND OF THE INVENTION

1. Field of the Invention

The present invention relates to a network system, and in particular to a network system comprising terminals and relaying nodes for transferring a packet.

In recent years, there have been introduced various applications for multi-media such as Internet FAX, Internet PHONE, and IP/TV. With the spread of the World Wide Web (WWW), Internet users have been easily able to share not only text information but also information such as voice and image. It is considered that the use of these applications brings on various merits such as an improvement in operation efficiency and a cost reduction. On the other hand, problems of increased multi-media traffic exhausting network resources and of failing to meet a satisfactory communication quality become serious.

Therefore, it is required to offer a service which selectively guarantees a communication quality by identifying and categorizing a network traffic. Namely, it is required to offer such a service as guarantees a certain communication quality regardless of the network usage rate or the network load by distinguishing the network traffic depending on the grade of users and the priority of applications, i.e. importance of business applications, and the communication quality such as delay or fluctuation of delay required by multi-media application.

In order to guarantee a certain communication quality, it is required that resources of more than a certain amount are allocated to a certain traffic (application) to guarantee the availability of such resources during the communication. For this purpose, it is necessary to provide a resource reservation mechanism which declares how much communication quality (delay, bandwidth, fluctuation, etc.) the traffic requires to the network or to devices on a route where the traffic is to be relayed, and which reserves the resources required for guaranteeing the communication quality.

2. Description of the Related Art

For the reservation of network resources used for communications, it has been known to use a resource reservation method called ST-II and to perform the reservation by procedures described as follows (see FIG. 24):

(1) When it is desired to secure network resources (i.e. when a resource reservation is made) for a data packet (hereinafter simply referred to as a "packet"), a packet transmitting terminal 1, which is going to transmit a package as a source, transmits a connection request (CONNECT) message to a packet receiving terminal 3, which is going to receive the packet as a destination, in order to secure the resources for the packet at relaying nodes 2a and 2b. In the connection request message, an identification information for identifying the packet, a requested resource reservation value (FlowSpec) indicating the amount of the resources desired to be secured, and its own address of the terminal 1 for notifying that the terminal 1 itself has last transmitted this message are to be stored.

(2) The relaying nodes 2a and 2b existing between the packet transmitting terminal 1 and the packet receiving terminal 3 once receive the connection request message, and then perform the following operations:

Transmitting an acknowledgement (ACK) message notifying a relaying node which has last relayed, or a packet transmitting terminal which has last transmitted, the connection request message (hereinafter referred to as "previous HOP") that the connection request message has been received.

Learning and storing the relaying node (previous HOP) which has last transmitted the connection request message.

Determining whether or not to accept the reservation request i.e. admission based on the resource reservation request value (FlowSpec) in the connection request message. If the reservation request should be accepted, then the connection request message is relayed. At the same time, in order to indicate that the node itself has last transmitted the message, the node puts its own node address into the connection request message.

(3) The packet receiving terminal 3 which has received the connection request message performs the following operations:

Transmitting an acknowledgement message notifying the relaying node which has last relayed, or the packet transmitting terminal which has last transmitted, the connection request message that the connection request message has been received.

Determining whether or not to accept the reservation request based on the resource reservation request value (FlowSpec) in the connection request message. If the reservation request should be accepted, in order to notify the packet transmitting terminal 1 that the connection request has been reserved at all the relaying nodes 2a and 2b, an acceptance (ACCEPT) message is transmitted to the relaying node which has last transmitted the connection request message.

(4) When receiving the acceptance message, the relaying nodes 2a and 2b perform the following operations:

Transmitting the acknowledgement message notifying the relaying node which has last relayed, or the packet receiving terminal which has last transmitted, the acceptance message that the acceptance message has been received.

Relaying the acceptance message to the previous HOP.

(5) When receiving the acceptance message, the packet transmitting terminal 1 transmits the acknowledgement message notifying the relaying node which has last relayed the acceptance message that the acceptance message has been received.

(6) The transmitting terminal 1 transmits the packet by way of a hop-by-hop route which passes through the relaying nodes with secured resources, i.e. a route on which the connection request message has been relayed.

The following applications will now be reviewed.

① Files on a server are downloaded by using FTP (File Transfer Protocol).

② A subscriber of a video-on-demand system requests to see a certain TV program.

In such applications, it is expected that a terminal equipment at a packet receiving end (a packet receiving terminal) can smoothly download files within a fixed period of time, or that packets can be transmitted with a delay shorter than a fixed period of time so that a constant reproduction quality may be maintained.

In these cases, it is required, not for a terminal equipment at the packet transmitting end (a packet transmitting terminal) to request the network for the resources to secure the communication quality, but for a packet receiving terminal to request the network for the resources to secure the communication quality. Namely, it is required for the packet receiving terminal to notify the amount of resources capable of securing the communication quality to the packet relaying nodes for the reservation of the resources.

However, such prior art, which makes the packet transmitting terminal perform the reservation of the network resources, is not applicable when the packet receiving terminal desires to reserve the network resources.

SUMMARY OF THE INVENTION

It is accordingly an object of the present invention to provide a network system in which a reservation of network resources may be requested from a packet receiving terminal side.

A network system according to the present invention for the achievement of the above-mentioned object is schematically illustrated in FIG. 1.

This network system, as illustrated, comprises a packet transmitting terminal 1, a packet relaying node 2, and a packet receiving terminal 3. Among these, the packet transmitting terminal 1 and the packet receiving terminal 3 both comprise reservation message processing units 4, 9, packet transferring units 5, 10; the relaying node 2 comprises a reservation acceptance determining unit 6 in addition to a reservation message processing unit 7 and a packet transferring unit 8.

Each portion of this network system will now be described in the following:

Packet Transferring Units 5, 8, and 10

These units perform data processing with respect to a packet. In the packet transmitting terminal 1 a packet transmitting process to the network is performed, in the packet receiving terminal 3 a packet receiving process from the network is performed, and in the relaying node 2 the destination of the packet received from the network is determined by using a routing table, thereby performing a process of transmitting the packet to the network.

Reservation Message Processing Units 4, 7, and 9

In these units, various types of messages used in the present invention are processed for exchanging those messages with the other relaying nodes and terminals.

In FIG. 2, a format of a network layer packet which stores the message is illustrated. In this example, the format is composed of a destination network address, a source network address, a protocol identifier (ID), and message data. The various types of message data are illustrated in FIGS. 3–8, which will be described hereinafter. It is to be noted that FIGS. 9 and 10 illustrate a packet identifier (ID) which is a parameter of a message packet and a resource reservation value.

① Request Message (REQ): see FIGS. 3, 9, and 10

This is a message which the packet receiving terminal 3 transmits to the packet transmitting terminal 1 when the former desires to have a reservation for the packet. This request message includes the following information:

Information for identifying the packet (packet identifier)
This is described in terms of a destination address, source address, protocol identifier, or the like.

Resources desired to be allocated for the packet (resource reservation value)
This is described in terms of a bandwidth, delay, delay fluctuation, or the like.

② Acknowledgement Message (ACK): see FIGS. 4, 9, and 10

This is a message that the packet transmitting terminal 1 transmits to the relaying node 2 when the former receives the request message and is requested to have a reservation for the packet; or that the relaying node 2 which has received the acknowledgement message transmits to a relaying node which will subsequently relay the packet or to the packet receiving terminal 3 which will receive the packet. The acknowledgement message includes the following information:

Information for identifying the packet (packet identifier)
This is described in terms of a destination address, source address, protocol identifier, or the like.

Resources desired to be allocated for the packet (resource reservation value)
This is described in terms of a bandwidth, delay, delay fluctuation, or the like.

The above information is indispensable. In order to improve the convenience, the following information may be stored in the message.

A flag indicating that the resource reservation value has been modified at a relaying node (reservation refusal flag)

When the relaying node 2 does not have enough resources to meet the resource reservation value, the resources are occasionally necessary to be secured within a range which can be secured at the relaying node. In this case, this flag is used to notify that the resource reservation value has been modified at the relaying node 2 to the other relaying nodes or to the packet receiving terminal 3.

A flag indicating that the resource reservation value has been modified at the packet transmitting terminal (reservation value modification flag)

The packet transmitting terminal 1 which has received the request message transmitted from the packet receiving terminal 3 compares the resource reservation value stored in the request message with the resources required by the packet to be reserved. If the condition requested by the requesting message is found to be the one more than required, the packet transmitting terminal 1 may modify the resource reservation value stored in the acknowledgement message. In this case, this flag is used to notify that the resource reservation value has been modified at the packet transmitting terminal 1 to the other relaying nodes or to the packet receiving terminal 3.

A flag used for requesting the packet receiving terminal to notify the result of a reservation procedure by a reservation completion notifying message (completion notification request flag)

The packet transmitting terminal 1 which requests the reservation completion notice sets this flag upon transmitting the acknowledgement message.

On the other hand, the relaying nodes which relay this acknowledgement message relay this flag transparently (i.e. without changing this flag).

③ Error Message (ERR): see FIGS. 5, 9, and 10

This is a message which is used when the reservation request has not been accepted for some reason; for example, the relaying node 2 has failed to make the reservation according to the condition requested for the reservation or the reservation has not been accepted due to an intention of a manager (management policy).

This error message includes the following information:

Information for identifying the packet (packet identifier)
This is described in terms of a destination address, source address, protocol identifier, or the like.

The above information is indispensable. In order to improve the convenience (if the acknowledgement message has the following information stored therein), the following information may be stored in the error message.

A flag used for requesting the packet receiving terminal to notify the result of a reservation procedure by the reservation completion notifying message (completion notification request flag)

If the reservation is refused at the relaying node 2, the value of the completion notice request flag included in the acknowledgement message is stored as it is in the error message.

④ Reservation Keeping Message (KEP): see FIGS. 6, 9, and 10

This is a message which is periodically transmitted by the packet receiving terminal 3 to the packet transmitting terminal 1, by the packet transmitting terminal 1 to the relaying node 2, or by the relaying node 2 to another relaying node or to the packet receiving terminal 3, in order to keep (retain) the resources reserved in the relaying node 2. On the other hand, if having received no reservation keeping message for more than a fixed period of time, each of the relaying nodes and the terminals releases the secured resources and discontinues the periodical transmission of the acknowledgement message.

This reservation keeping message includes the following information:

Information for identifying the packet (packet identifier)
This is described in terms of a destination address, source address, protocol identifier, or the like.
Resources desired to be allocated for the packet (resource reservation value)
This is described in terms of a bandwidth, delay, delay fluctuation, or the like.

⑤ Reserved Resource Releasing Message (RLS): see FIGS. 7 and 9

This is a message which is transmitted by the packet receiving terminal 3 to the packet transmitting terminal 1, by the packet transmitting terminal 1 to the relaying node 2, or by the relaying node 2 to another relaying node or to the packet receiving terminal 3, in order to release the resources secured in the relaying node 2.

This reserved resource releasing message includes the following information:

Information for identifying the packet (packet identifier)
This is described in terms of a destination address, source address, protocol identifier, or the like.

⑥ Reservation Completion Notifying Message (NTF): see FIGS. 8 and 9

By transmitting the reservation completion notifying message to the packet transmitting terminal 1, the packet receiving terminal 3 is able to notify the packet transmitting terminal 1 whether or not the reservation previously made by the acknowledgement message has been accepted.

The reservation completion notifying message includes the following information:

Information for identifying the packet (packet identifier)
This is described in terms of a destination address, source address, protocol identifier, or the like.
A flag indicating whether or not the reservation request has been completed (reservation completion flag)

Reservation Acceptance Determining Unit 6

This unit is required in the relaying node 2. By using the information (the packet identifier and the resource reservation value) included in the received acknowledgement message, this unit determines whether or not the resources meeting the reservation request value can or may be secured for the packet which has requested the reservation, and also determines whether or not to accept the reservation.

Depending on the result of the above, this unit sends an order to the reservation message processing unit 7 so as to secure the resources and to perform an appropriate message processing.

By using the transmitting terminal, the receiving terminal, and the relaying nodes, and various types of messages as described above, the network system according to the present invention has the following features:

the reservation message processing unit 9 of the packet receiving terminal 3 transmits to the packet transmitting terminal 1 the request message in which the reservation request condition is stored in order to request a resource reservation for the packet; the reservation message processing unit 4 of the packet transmitting terminal 1 having received the request message transmits to the relaying nodes 2 on the same route as the packet the acknowledgement message in which the reservation request condition is stored; the reservation message processing unit 7 of each relaying node 2 provides the resource reservation for the home relaying node according to the reservation request condition in the acknowledgement message and transfers the acknowledgement message to the same route as the packet; and after the acknowledgement message has passed through all the relaying nodes 2 which relay the packet and then the reservation message processing unit 9 of the packet receiving terminal 3 has received the acknowledgement message, a network resource reservation procedure is completed.

The above-mentioned acknowledgement message may store the address of the packet receiving terminal 3 and the protocol identifier which specifies the protocol indicating the resource reservation procedure, the packet transmitting terminal 1 and the relaying nodes 2 may respectively maintain in their reservation message processing units 4 and 7 the routing table for transmitting the acknowledgement message to the same route as the packet, and may have the reservation message processing unit 7 of each relaying node 2 check the protocol identifier to determine whether or not to receive the acknowledgement message.

The above-mentioned acknowledgement message may store the address of the packet receiving terminal 3 and the address of the subsequent relaying node 2 which is retrieved by using the address of the packet receiving terminal 3 as a key from the routing table for transmitting the acknowledgement message to the same route as the packet, the packet transmitting terminal 1 and the relaying nodes 2 may respectively maintain the routing table in their reservation message processing units 4 and 7, and may have the reservation message processing unit 7 of each relaying node 2 check if the address in the acknowledgement message is a home address to determine whether or not to receive the acknowledgement message.

The reservation acceptance determining unit 6 of each relaying node 2 may determine whether or not to accept the reservation request condition in the acknowledgement message, and the reservation message processing unit 7 may transfer the acknowledgement message if the condition should be accepted, but may transmit the error message notifying the error to the packet receiving terminal 3 if not.

The reservation acceptance determining unit 6 of each relaying node 2 may determine whether or not to accept the reservation request condition in the acknowledgement message, and the reservation message processing unit 7 may transfer the acknowledgement message if the condition should be accepted, but may provide the resource reservation with an allowable condition for each relaying node 2 to accept the reservation and transfer the acknowledgement message which has the reservation request condition modified to the accepted condition if not.

A flag may be provided in the acknowledgement message to indicate that the reservation request condition has been modified, the flag may be set when the reservation message processing unit 7 of each relaying node 2 modifies the reservation request condition in the acknowledgement message, and by checking the flag the reservation message processing unit 9 of the packet receiving terminal 3 may confirm whether or not the reservation request has been accepted by each relaying node 2.

The reservation message processing unit 9 of the packet receiving terminal 3 may compare the requested reservation request condition with the reservation request condition stored in the acknowledgement message and confirm, depending on the compared result, whether or not the reservation request has been accepted by each relaying node 2.

The reservation message processing unit 9 of the packet receiving terminal 3, having confirmed by receiving the error message that the reservation request has not been accepted, may modify the reservation request condition and resend the request reservation.

In order to release the reserved resource within each relaying node 2, the reserved resource releasing message may be sent in at least one of the following directions:

from the packet receiving terminal 3 to the packet transmitting terminal 1;

from the packet transmitting terminal 1 to the relaying nodes 2;

between the relaying nodes 2; and from the relaying nodes 2 to the packet receiving terminal 3.

In order to maintain the resource within each relaying node 2, the reservation keeping message may be transmitted periodically in at least one of the following directions:

from the packet receiving terminal 3 to the packet transmitting terminal 1;

from the packet transmitting terminal 1 to the relaying nodes 2;

between the relaying nodes 2; and from the relaying nodes 2 to the packet receiving terminal 3, and if the resource reservation keeping message has not been received for more than a fixed period of time the resource may be released and the periodical transmission of the resource reservation keeping message may be discontinued.

The reservation message processing unit 4 of the packet transmitting terminal 1 may compare a resource specified in the reservation request condition within the received request message and a resource required by the packet to be reserved, and if the former is larger than the latter, transmit the acknowledgement message after the reservation request condition having been modified.

A flag may be provided in the acknowledgement message to indicate that the reservation condition has been modified, the flag may be set when the packet transmitting terminal 1 modifies the reservation condition in the acknowledgement message, and by checking the flag the packet receiving terminal 3 may confirm whether or not the reservation request condition has been modified by the packet transmitting terminal 1 to the resource required by the packet.

The reservation message processing units of the packet transmitting terminal 1 and the relaying nodes 2 may preliminarily modify the reservation condition in the received message according to control information on resource reservation made by at least one of a network manager and a manager of the relaying node 2.

A flag may be provided in the acknowledgement message in order for the packet receiving terminal 3 to notify the completion of the reservation procedure to the packet transmitting terminal 1, the reservation message processing unit of the packet transmitting terminal 1 may set the flag upon transmitting the acknowledgement message, and the reservation message processing unit of the packet receiving terminal 3 which has received the acknowledgement message with the flag set may notify the completion of the reservation procedure to the packet transmitting terminal 1 through the reservation completion notifying message.

As for the packet transmitting terminal according to the present invention handling packets which have stored therein reservation request conditions for resource reservation, the packet transmitting terminal which has received a request message which has stored therein the reservation request conditions for resource reservation requested by the packet receiving terminal may perform routing an acknowledgement message which has stored therein the reservation request condition to the relaying node by the reservation message processing unit of the packet transmitting terminal.

As for the relaying node according to the present invention handling packets which have stored therein reservation request conditions, the relaying node which has received an acknowledgement message which has stored therein the reservation request conditions for resource reservation requested by the packet transmitting terminal may provide the resource reservation for the home relaying node according to the reservation request condition in the acknowledgement message and perform routing the acknowledgement message to another relaying node or to the packet receiving terminal by the reservation message processing unit of the relaying node.

The packet receiving terminal according to the present invention handling packets which have stored therein reservation request conditions, upon receiving the acknowledgement message which has stored therein the reservation request conditions requested by the relaying node, may complete the resource reservation procedure with the packet transmitting terminal.

BRIEF DESCRIPTION OF THE DRAWINGS

Throughout the figures, the same reference numerals indicate identical or corresponding portions.

DESCRIPTION OF THE EMBODIMENTS

Hereinafter, a network system according to the present invention will be described in detail as to the embodiments by taking, as an example, a case where resources are reserved in a uni-cast communication and an IP (internet protocol) is used as a network layer protocol, referring to FIGS. 11–23. It is to be noted that numerals in parentheses in each figure correspond to the following procedure numbers, that there are two relaying nodes 2a and 2b existing between terminals 1 and 3, and that the respective IP addresses are as illustrated in the figures.

Figure 11:
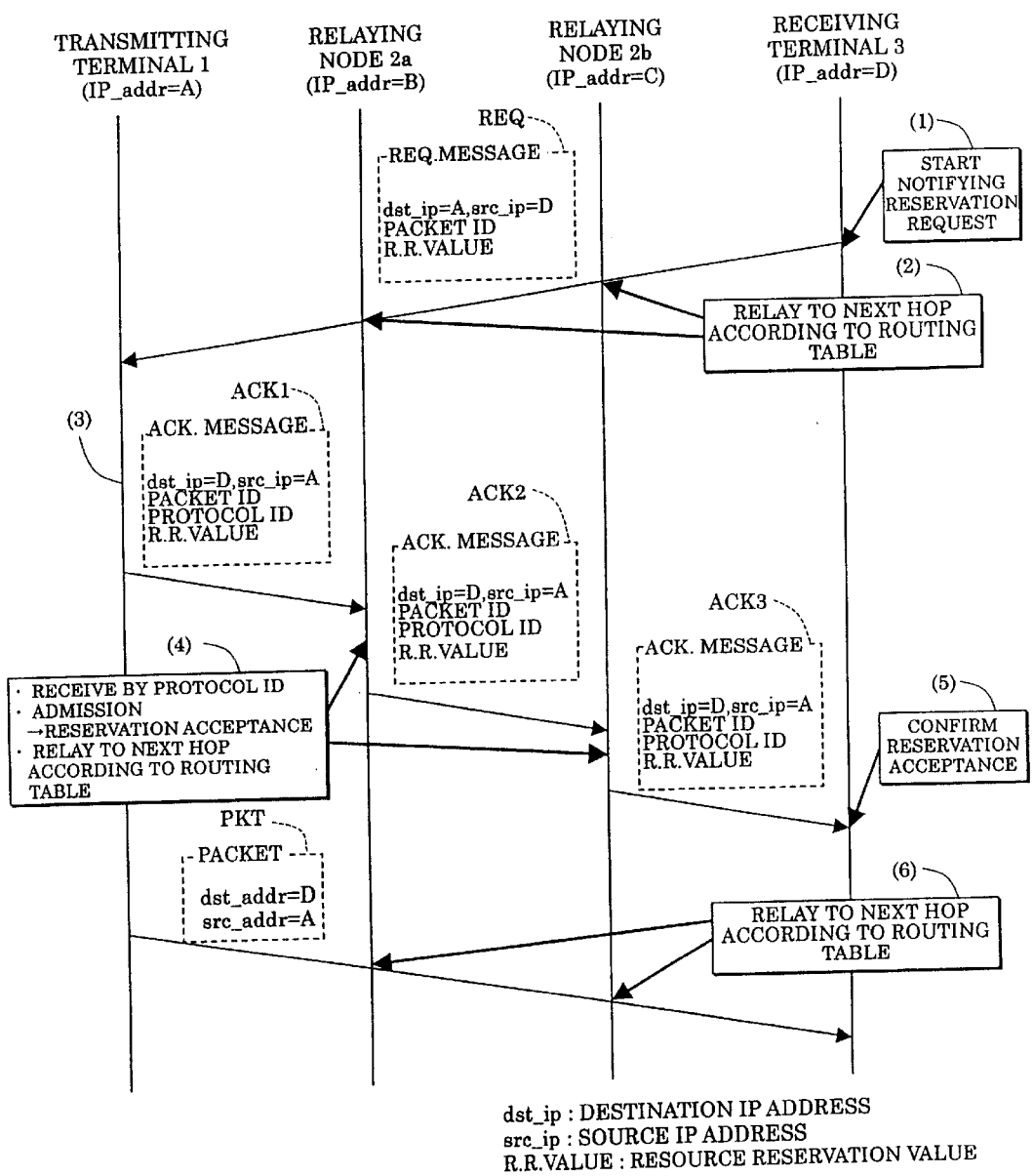
FIG. 11 is a sequence chart of a resource reservation procedure embodiment (1) in a network system according to the present invention.

[1] Resource Reservation Procedure Embodiment (1): see FIG. 11

Figure 1:
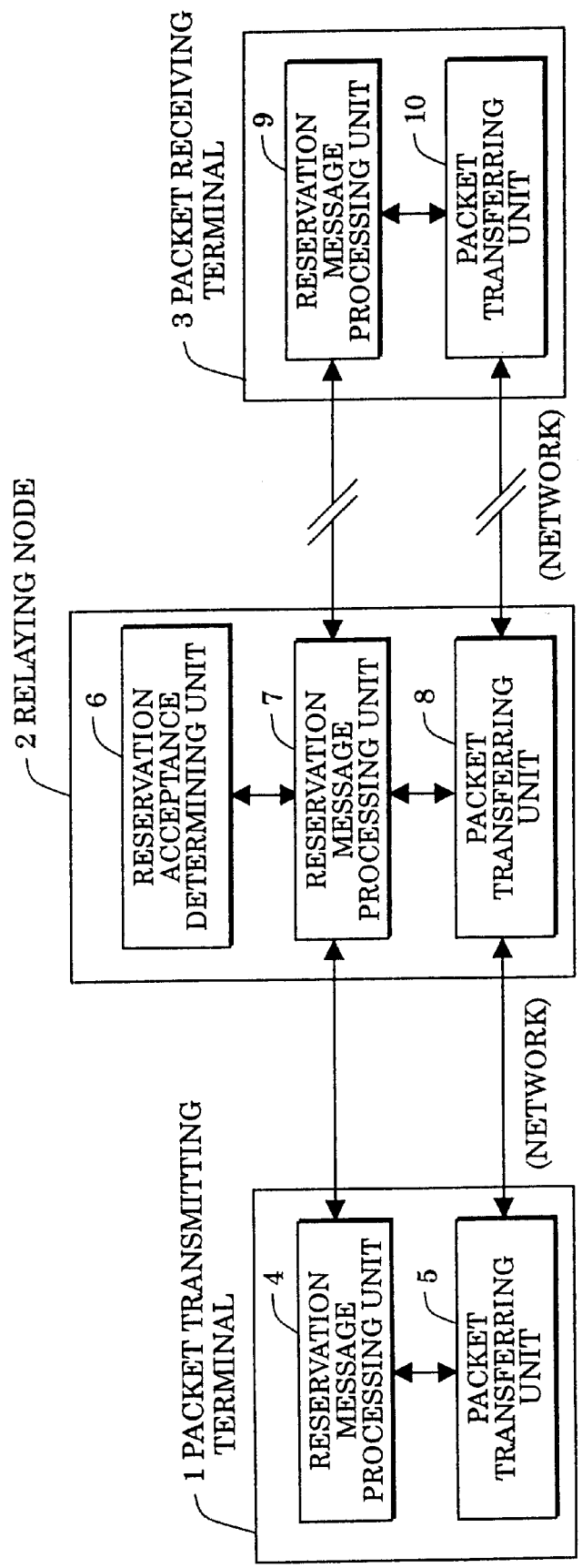
FIG. 1 is a block diagram illustrating a schematic arrangement of a network system according to the present invention.
Figure 2:
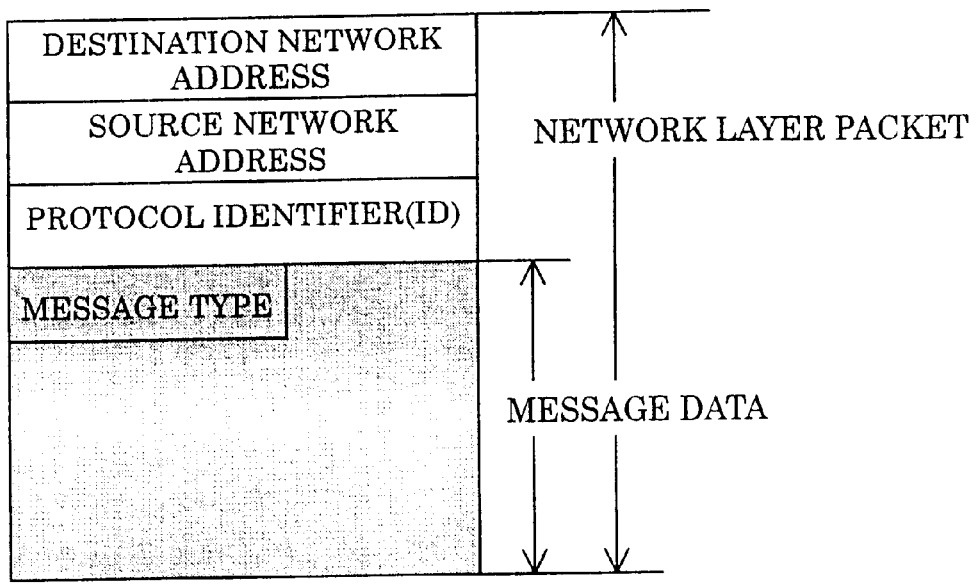
FIG. 2 is a format of a message packet used in a network system according to the present invention.
Figure 3:
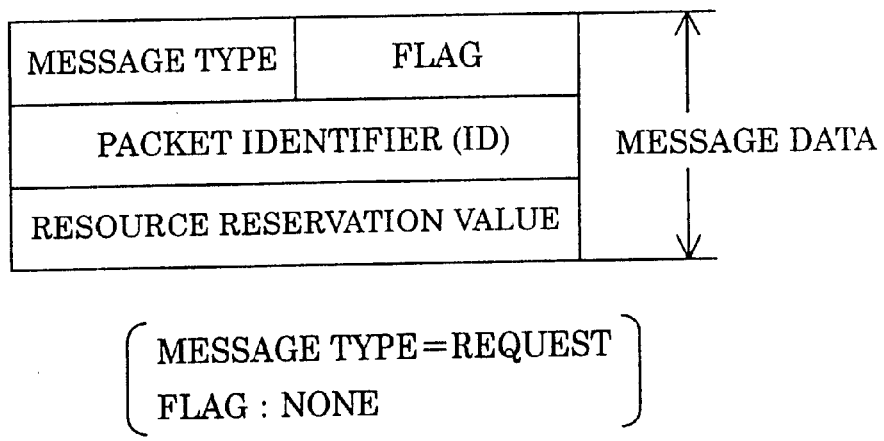
FIG. 3 is a format of a request message used in a network system according to the present invention.
Figure 4:
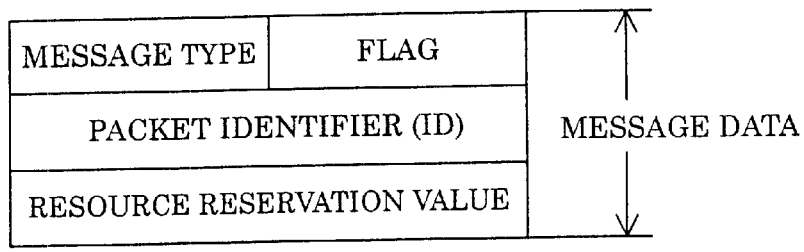
FIG. 4 is a format of an acknowledgement message used in a network system according to the present invention.
Figure 5:
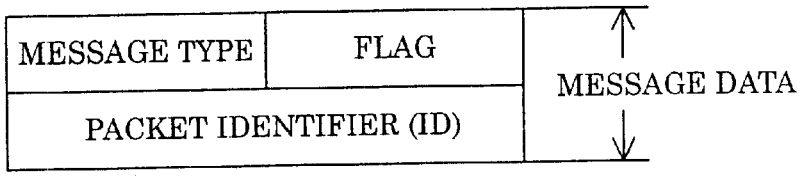
FIG. 5 is a format of an error message used in a network system according to the present invention.
Figure 6:
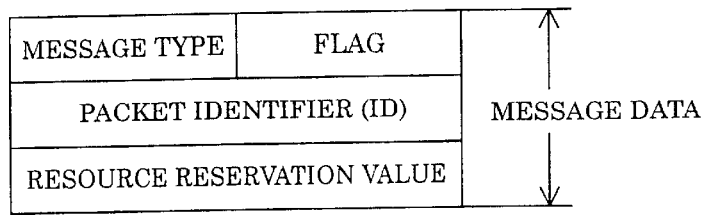
FIG. 6 is a format of a reservation keeping message used in a network system according to the present invention.
Figure 7:
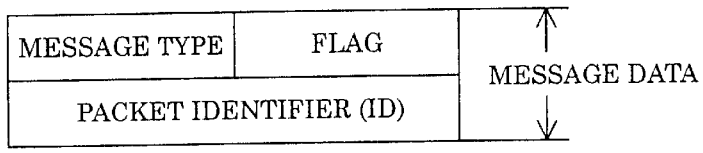
FIG. 7 is a format of a reserved resource releasing message used in a network system according to the present invention.
Figure 8:
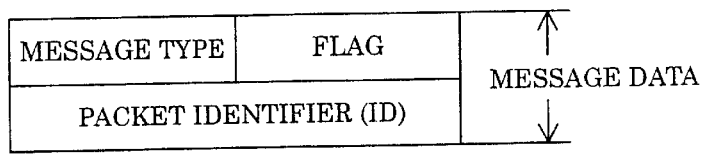
FIG. 8 is a format of a reservation completion notifying message used in a network system according to the present invention.

It is assumed that a protocol identifier (see FIG. 2) of an IP packet, having stored therein an acknowledgement message (see FIG. 4), used in this embodiment is a proper identifier indicating a resource reservation procedure according to the present invention. However, the IP packet having stored therein a request message need not necessarily be an identifier indicating the resource reservation procedure according to the present invention.

Figure 9:
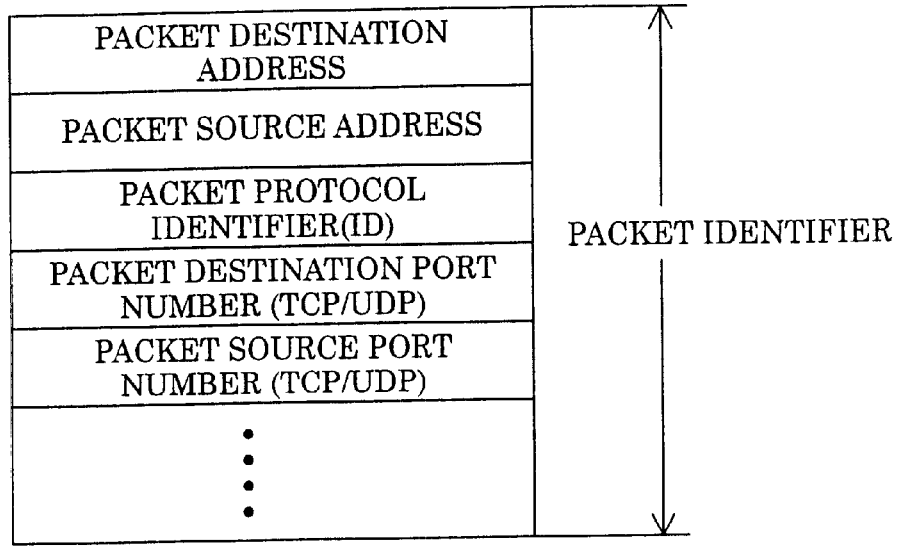
FIG. 9 is a format of a packet identifier (ID) used in a network system according to the present invention.
Figure 10:
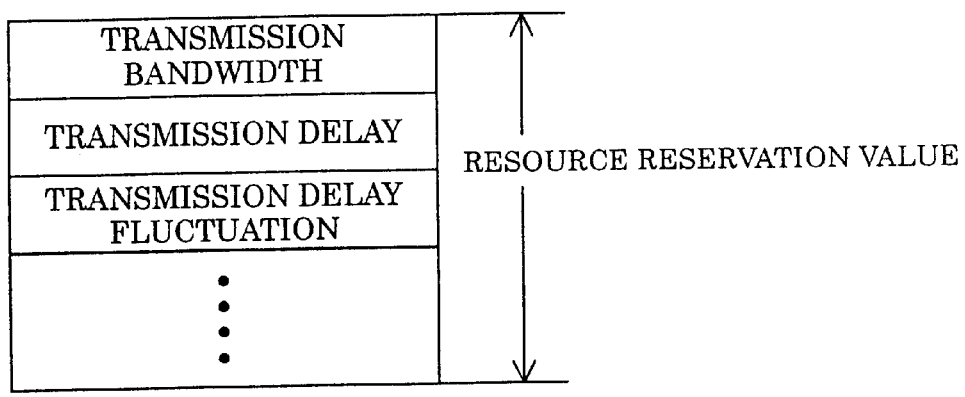
FIG. 10 is a format of a resource reservation value used in a network system according to the present invention.

(1) A packet receiving terminal 3 performing the resource reservation stores a packet identifier (ID) for specifying a packet which is an object of the reservation and requested resources (resource reservation value) for the packet in the request message REQ, which is then transmitted to a packet transmitting terminal 1 by a uni-cast method. It is to be noted that the packet identifier, as described in relation to FIG. 9, includes a destination (transmitting terminal 1) IP address A, a source (receiving terminal 3) IP address D, a packet protocol identifier, a destination port number of the TCP/UDP, a source port number, and the like.

(2) The relaying nodes 2a and 2b existing between the receiving terminal 3 and the transmitting terminal 1 relay the request message REQ in the same way as an ordinary IP packet according to a routing table which is maintained in a reservation message processing unit 7. Then, the request message REQ is relayed in the form of hop-by-hop to the transmitting terminal 1.

(3) The transmitting terminal 1 which has received the request message REQ addressed to itself transmits an acknowledgement message ACK1, which has stored therein the destination address D of the packet as the address of the terminal 3, as well as the packet identifier and the resource reservation value. This may be made by a reservation message processing unit 4 performing an output process in the same way as an ordinary IP packet.

(4) The relaying nodes 2a and 2b existing between the transmitting terminal 1 and the receiving terminal 3 check the protocol identifier which is written in the IP headers of all the packets to be relayed. If it is found that the acknowledgement message has the protocol identifier which is an ID indicating the resource reservation procedure proper to this embodiment, the relaying nodes 2a and 2b respectively receive the acknowledgement messages ACK1, 2, determine whether or not the resources can be secured in the relaying nodes by the requested resource reservation value based on the packet identifier and the resource reservation value in the acknowledgement message ACK1, 2, and determine whether or not to accept the reservation: Admission control by a reservation acceptance determining unit 6.

As a result of this admission control, if the reservation has been accepted, the resources which guarantee the communication quality of the packet are secured in the relaying node. Then, the received acknowledgement messages ACK1, 2 are respectively transmitted without any change towards the receiving terminal 3 as the acknowledgement messages ACK2, 3. Also in this case, the reservation message processing unit 7 performs the output process in the same way as an ordinary IP packet.

(5) The packet receiving terminal 3 receives the acknowledgement message ACK3 addressed to itself and confirms that the resources have been reserved with the resource reservation value requested by every relaying node on the route where the packet is to be relayed.

(6) The packet transmitting terminal 1 transmits the packet PKT to the packet receiving terminal 3 when a fixed period of time has elapsed after transmitting the acknowledgement message ACK1. Then the packet PKT is relayed in the form of hop-by-hop at each relaying nodes 2a and 2b, and reaches the receiving terminal 3.

Figure 12:
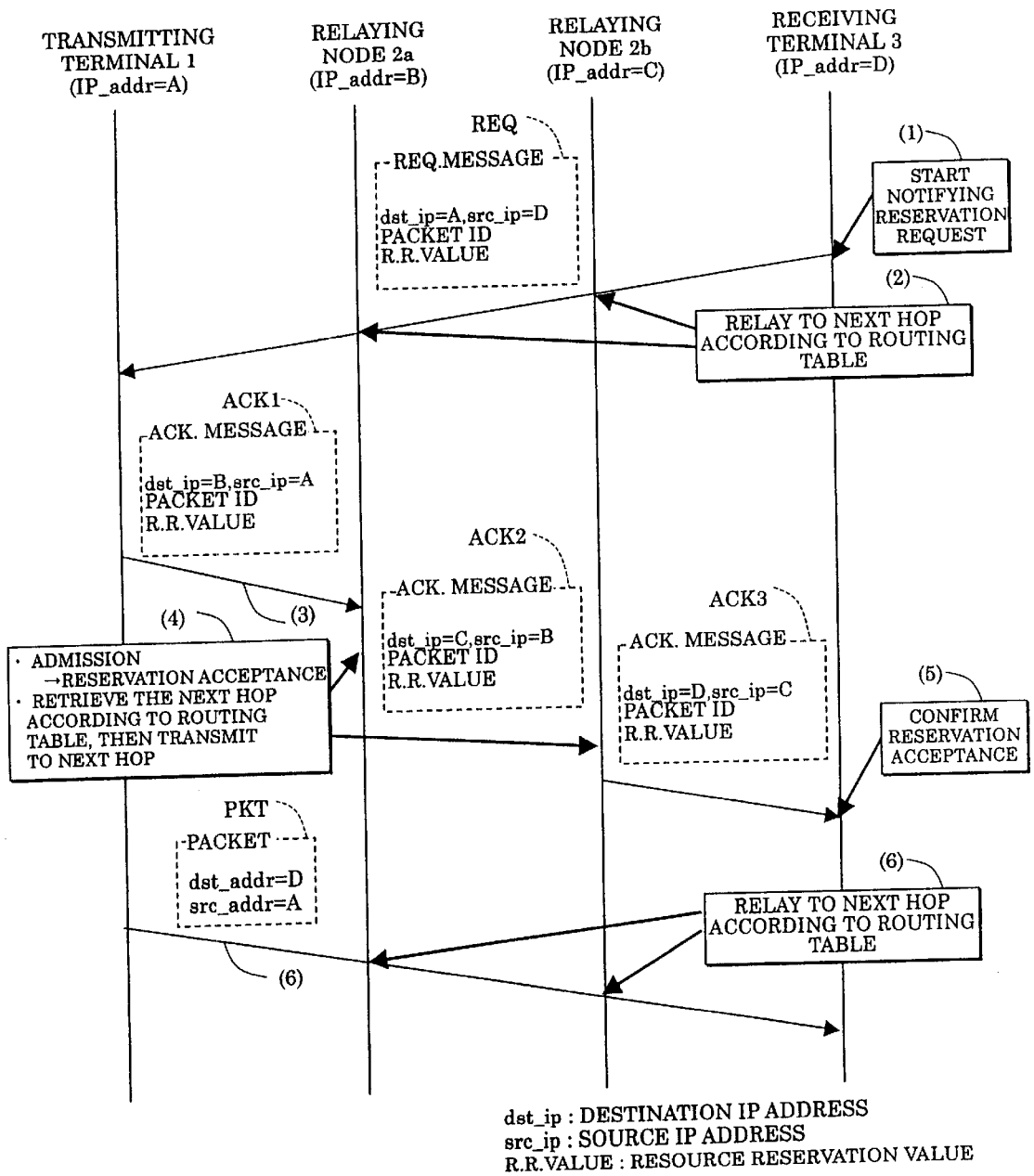
FIG. 12 is a sequence chart of a resource reservation procedure embodiment (2) in a network system according to the present invention.

[2] Resource Reservation Procedure Embodiment (2): see FIG. 12

In the above embodiment (1), the IP packet in which the acknowledgement message ACK is stored has the proper protocol identifier indicating the resource reservation procedure according to the present invention. However, in this embodiment (2) the protocol identifier of the IP packet in which the acknowledgement message ACK is stored need not have a proper identifier.

(1) A packet receiving terminal 3 performing the resource reservation stores the packet identifier for specifying the packet which is an object of the reservation and the requested resources (resource reservation value) for the packet in the request message REQ, which is then transmitted to the packet transmitting terminal 1 by a uni-cast method.

(2) The relaying nodes 2a and 2b existing between the receiving terminal 3 and the transmitting terminal 1 relay the request message REQ in the same way as an ordinary IP packet according to the routing table. Then, the request message REQ is relayed in the form of hop-by-hop to the transmitting terminal 1.

(3) The transmitting terminal 1 which has received the request message REQ addressed to itself stores the packet identifier and the resource reservation value in the acknowledgement message ACK1. Then, with the destination address D of the packet as a key, an address B of the relaying node 2a is retrieved from the routing table as the next HOP and the acknowledgement message is transmitted with the address B as the destination address.

(4) The relaying node 2a which has received the acknowledgement message ACK1 addressed to itself determines whether or not the resources can be secured in the relaying node 2a with the requested resource reservation value based on the packet identifier and the resource reservation value in the acknowledgement message ACK1, and determines whether or not to accept the reservation: Admission control by the reservation acceptance determining unit 6

As a result of this admission control, if the reservation has been accepted, the resources which guarantee the communication quality of the packet specified by the resource reservation value are secured in the relaying node 2a. Then, without changing the contents of the received acknowledgement message ACK1 and with the destination address D of the packet as a key, an address C of the relaying node 2b is retrieved from the routing table as the next HOP and the acknowledgement message ACK2 is transmitted with the address C as the destination address.

The relaying node 2b which receives this acknowledgement ACK2 performs the same process as mentioned above and transmits an acknowledgement message ACK3 to the receiving terminal 3.

(5) The packet receiving terminal 3 receives the acknowledgement message ACK3 addressed to itself, and confirms that the resources have been reserved with the requested resource reservation value at the relaying nodes 2a and 2b on the route where the packet is to be relayed.

(6) The packet transmitting terminal 1 transmits the packet PKT to the packet receiving terminal 3 when a fixed period of time has elapsed after transmitting the acknowledgement message ACK1. Then the packet PKT is relayed in the form of hop-by-hop at the relaying nodes 2a and 2b and reaches the receiving terminal 3. It is to be noted that the packet is relayed with the resources reserved at each node.

Figure 13:
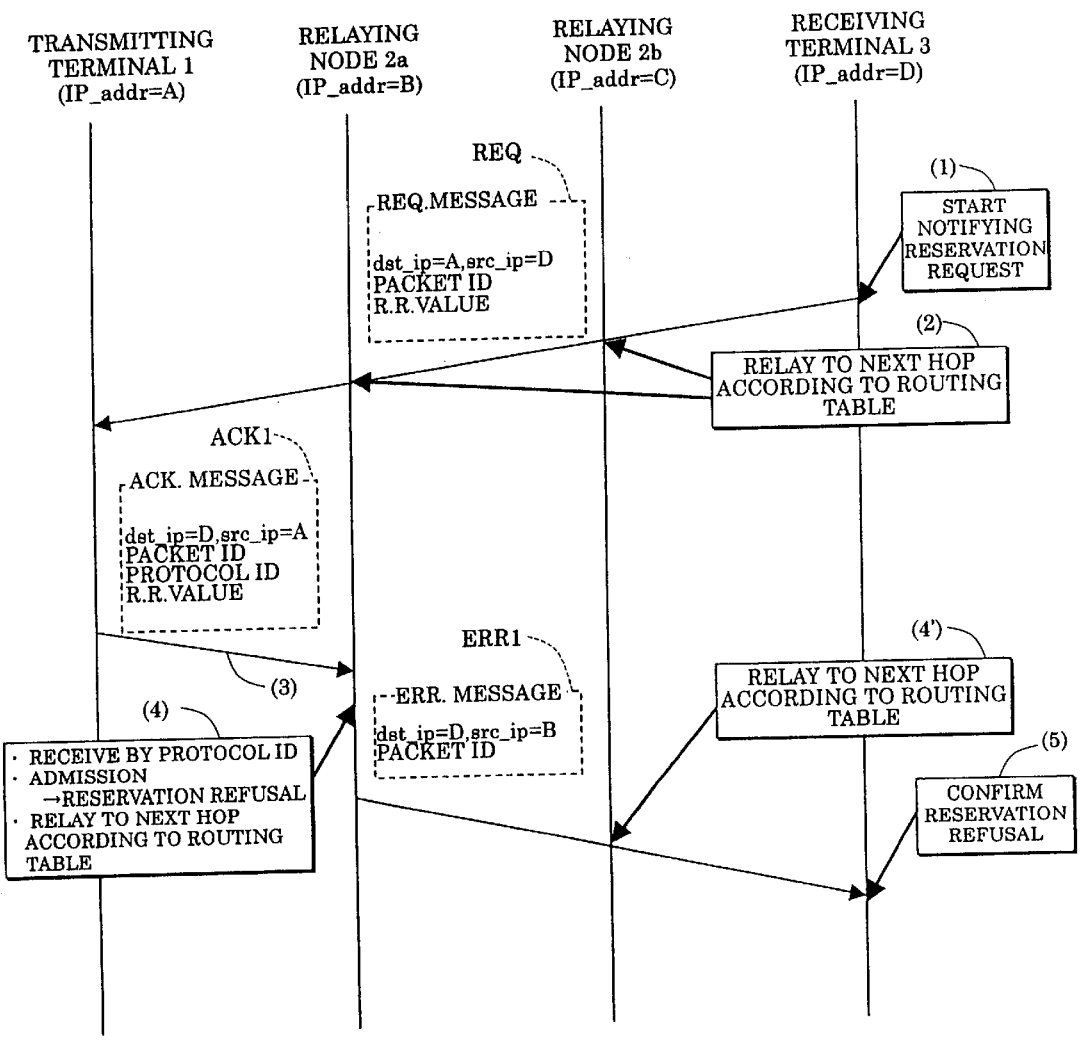
FIG. 13 is a sequence chart of a reservation refusal procedure embodiment (1) in a network system according to the present invention.

[3] Reservation Refusal Procedure Embodiment (1): see FIG. 13

This is a procedure in case that the relaying nodes 2a and 2b refuse the reservation request for some reasons; for example, the amount of the resources securable at the relaying nodes 2a and 2b is smaller than the notified resource reservation value.

(1) A packet receiving terminal 3 performing the resource reservation stores the packet identifier for specifying the packet which is an object of the reservation and the requested resources (resource reservation value) for the flow in the request message, which is then transmitted to the packet transmitting terminal 1 by a uni-cast method.

(2) The relaying nodes existing between the receiving terminal 3 and the transmitting terminal 1 relay the request message REQ in the same way as an ordinary IP packet according to the routing table. Then, the request message REQ is relayed in the form of hop-by-hop to the transmitting terminal 1.

(3) The transmitting terminal 1 which has received the request message REQ addressed to itself transmits the acknowledgement message ACK1 which has stored therein the destination address D of the packet as the destination address, as well as the packet identifier and the resource reservation value: Output process in the same way as an ordinary IP packet performed by the request message processing unit 4.

(4) The relaying node 2a existing between the transmitting terminal 1 and the receiving terminal 3 checks the protocol identifier which is written in the IP headers of all the packets to be relayed. If the acknowledgement message has the protocol identifier which is an ID indicating the resource reservation procedure based on the present invention, the relaying node 2a receives the acknowledgement messages ACK1, determines whether or not the resources can be secured in the relaying node with the requested resource reservation value based on the packet identifier and the resource reservation value in the acknowledgement message ACK1, and determines whether or not to accept the reservation: Admission control by the reservation acceptance determining unit 6.

As a result of this admission control, if the reservation has not been accepted, an error message ERR1 in which the packet identifier is stored is transmitted toward the packet receiving terminal 3: Also an output process in the same way as an ordinary IP packet.

(4') The relaying nodes existing between the receiving terminal and the relaying node 2 which has transmitted the error message ERR1, relay the error message in the same way as an ordinary IP packet according to the routing table. Then, the error message ERR1 is relayed in the form of hop-by-hop to the receiving terminal 3.

(5) The packet receiving terminal 3 receives the error message ERR1, and confirms that the reservation has been refused at one of the relaying nodes on the route where the packet is to be relayed.

Figure 14:
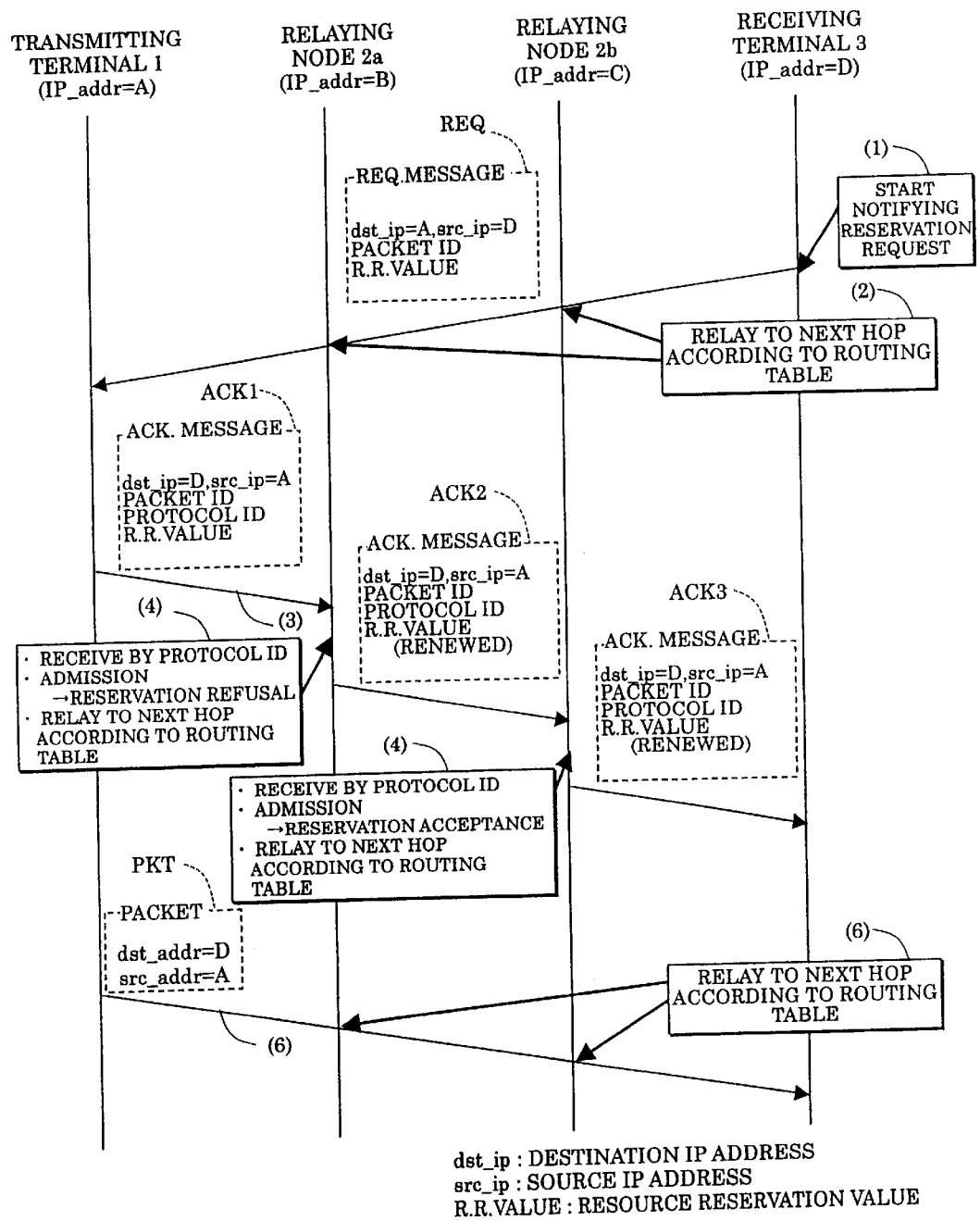
FIG. 14 is a sequence chart of a reservation refusal procedure embodiment (2) in a network system according to the present invention.
Figure 15:
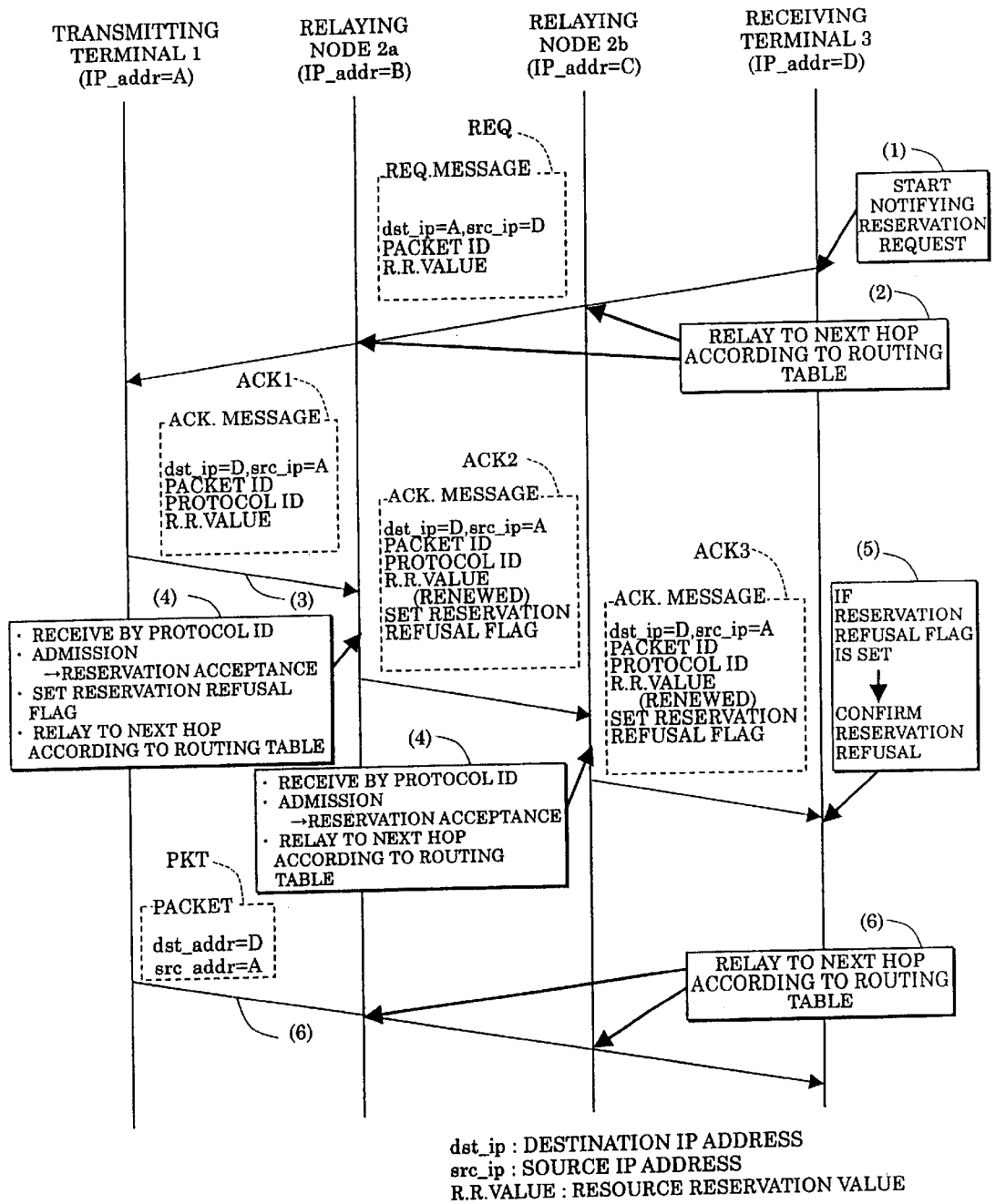
FIG. 15 is a sequence chart of a reservation refusal procedure embodiment (3) in a network system according to the present invention.

[4] Reservation Refusal Procedure Embodiments (2) and (3): see FIGS. 14 and 15

In the above-mentioned reservation refusal procedure embodiment (1), the error message has been transmitted toward the receiving terminal 3 when the reservation has not been accepted. In these embodiments (2) and (3), however, modified examples in case that the reservation is not accepted will be described.

(1) The packet receiving terminal 3 performing the resource reservation stores the packet identifier for specifying the packet which is an object of the reservation and the requested resources (resource reservation value) for the packet in the request message REQ, which is then transmitted to the packet transmitting terminal 1 by a uni-cast method.

(2) The relaying nodes 2a and 2b existing between the receiving terminal 3 and the transmitting terminal 1 relay the request message REQ in the same way as an ordinary IP packet according to the routing table. Then, the request message REQ is relayed in the form of hop-by-hop to the transmitting terminal 1.

(3) The transmitting terminal 1 which has received the request message REQ addressed to itself transmits the acknowledgement message ACK1 which has stored therein the destination address D of the packet as the destination address, as well as the packet identifier and the resource reservation value: The same output process as an ordinary IP packet.

(4) The relaying nodes 2a and 2b existing between the transmitting terminal 1 and the receiving terminal 3 check the protocol identifier which is written in the IP headers of all the packets to be relayed. If the acknowledgement message has the protocol identifier which is an ID indicating the resource reservation procedure proper to the present invention, the relaying nodes 2a and 2b receive the acknowledgement messages ACK1, 2, determine whether or not the resources can be secured in the relaying nodes with the requested resource reservation value based on the packet identifier and the resource reservation value in the acknowledgement messages ACK1, 2, and determine whether or not to accept the reservation: Admission control as above-mentioned.

If the reservation has been refused, the maximum resources currently available are secured. The resource reservation value of the acknowledgement message ACK is modified to the secured resources.

Also, it is desirable, as illustrated in the modified example of FIG. 15, to set a flag indicating that the reservation has been refused (reservation refusal flag). Then, the acknowledgement messages ACK2 and ACK3 are transmitted, and the acknowledgement message ACK3 is transmitted to the receiving terminal 3: The same output process as an ordinary IP packet.

(5) The receiving terminal 3 which has received the acknowledgement message addressed to itself confirms the following items in accordance with the information in the acknowledgement message ACK3 (see FIG. 15).

If the flag indicating that the reservation has been refused (reservation refusal flag) is set, the reservation is denied at one of the relaying nodes on the route where the packet is to be relayed.

If the flag indicating that the reservation has been refused (reservation refusal flag) is reset, resources are reserved with the requested reservation value at all the relaying nodes on the route where the packet is to be relayed.

(6) The packet transmitting terminal 1 transmits the packet PKT to the packet receiving terminal 3 when a fixed period of time has elapsed after transmitting the acknowledgement message ACK1. Then the packet PKT is relayed in the form of hop-by-hop at the relaying nodes 2a and 2b and reaches the receiving terminal 3. It is to be noted that the packet is relayed with the resources reserved at each node.

Figure 16:
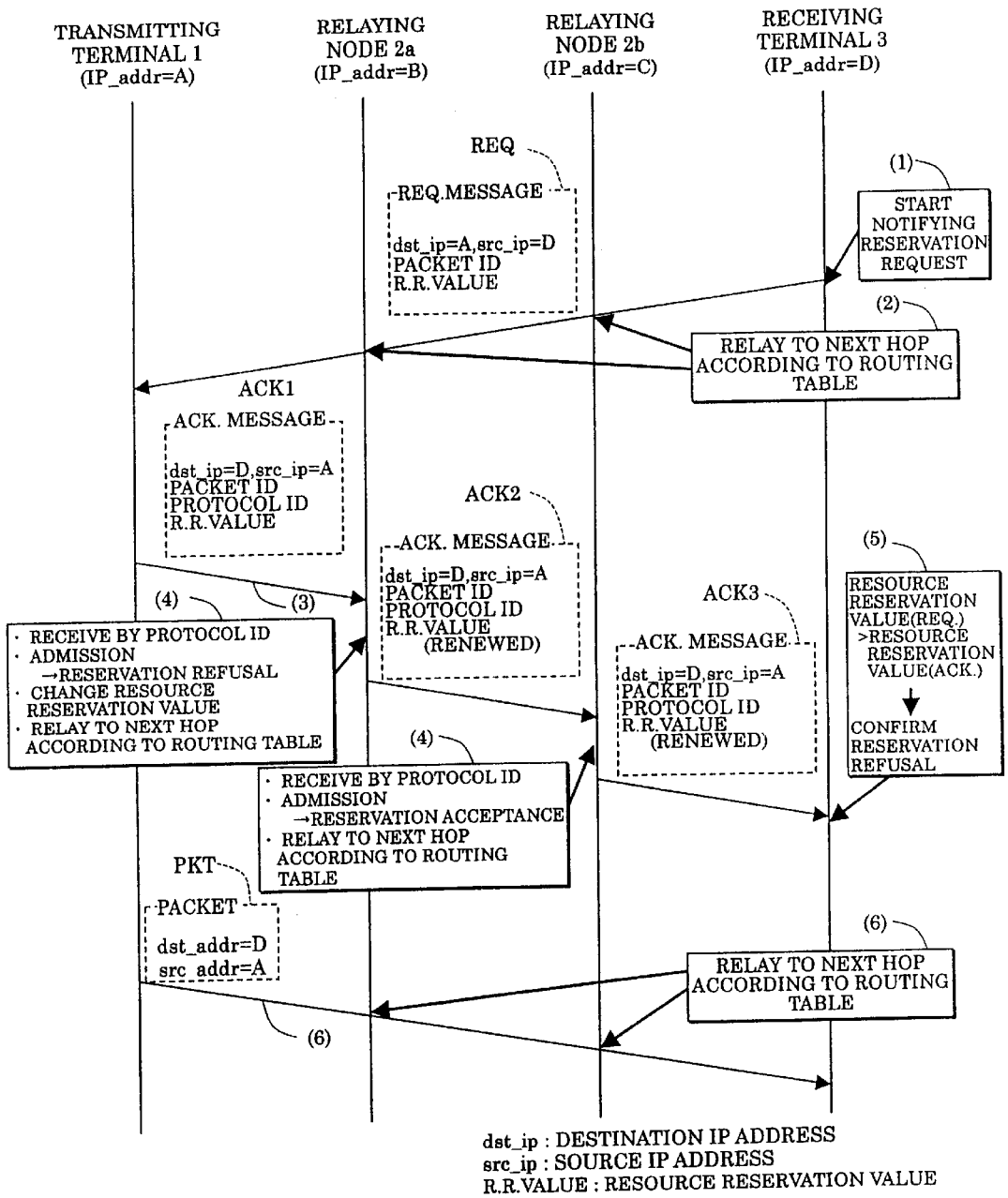
FIG. 16 is a sequence chart of a reservation refusal procedure embodiment (4) in a network system according to the present invention.

[5] Reservation Refusal Procedure Embodiment (4): see FIG. 16

This embodiment shows a case where the reservation is refused by a method which is not included in the above-mentioned reservation refusal procedure embodiments (1)–(3).

(1) The packet receiving terminal 3 performing the resource reservation stores the packet identifier for specifying the packet which is an object of the reservation and the requested resources (resource reservation value) for the packet in the request message REQ, which is then transmitted to the packet transmitting terminal 1 by a uni-cast method.

(2) The relaying nodes 2a and 2b existing between the receiving terminal 3 and the transmitting terminal 1 relay the request message REQ in the same way as an ordinary IP packet according to the routing table. Then, the request message REQ is relayed in the form of hop-by-hop to the transmitting terminal 1.

(3) The transmitting terminal 1 which has received the request message REQ addressed to itself transmits the acknowledgement message ACK1 which has stored therein the destination address D of the packet as the destination address, as well as the packet identifier and the resource reservation value: The same output process as an ordinary IP packet.

(4) The relaying nodes 2a and 2b existing between the transmitting terminal 1 and the receiving terminal 3 check the protocol identifier which is written in the IP headers of all the packets to be relayed. If the acknowledgement message has the protocol identifier which is an ID indicating the resource reservation procedure proper to the present invention, the relaying nodes 2a and 2b receive the acknowledgement messages ACK1, 2, determine whether or not the resources can be secured in the relaying nodes with the requested resource reservation value based on the packet identifier and the resource reservation value in the acknowledgement messages ACK, and determine whether or not to accept the reservation: Admission control as above-mentioned.

If the reservation has been refused, the maximum resources currently available are secured. The resource reservation value of the acknowledgement messages ACK2, 3 is modified to the secured resources. Then, the acknowledgement message ACK3 is transmitted to the receiving terminal 3: The same output process as an ordinary IP packet.

(5) The receiving terminal 3 which has received the acknowledgement message ACK3 addressed to itself compares the requested reservation value in the acknowledgement message with the reservation request value in the request message REQ which has been previously transmitted and confirms the following items:

If the former is smaller than the latter, the reservation is refused at one of the relaying nodes on the route where the packet is to be relayed.

If the former is equal to or larger than the latter, then the resources are reserved with the requested reservation value at all the relaying nodes 2a and 2b on the route where the packet is to be relayed.

(6) The packet transmitting terminal 1 transmits the packet PKT to the packet receiving terminal 3 when a fixed period of time has elapsed after transmitting the acknowledgement message ACK1. Then the packet PKT is relayed in the form of hop-by-hop and reaches the receiving terminal 3. It is to be noted that the packet is relayed with the resources reserved at each node.

Figure 17:
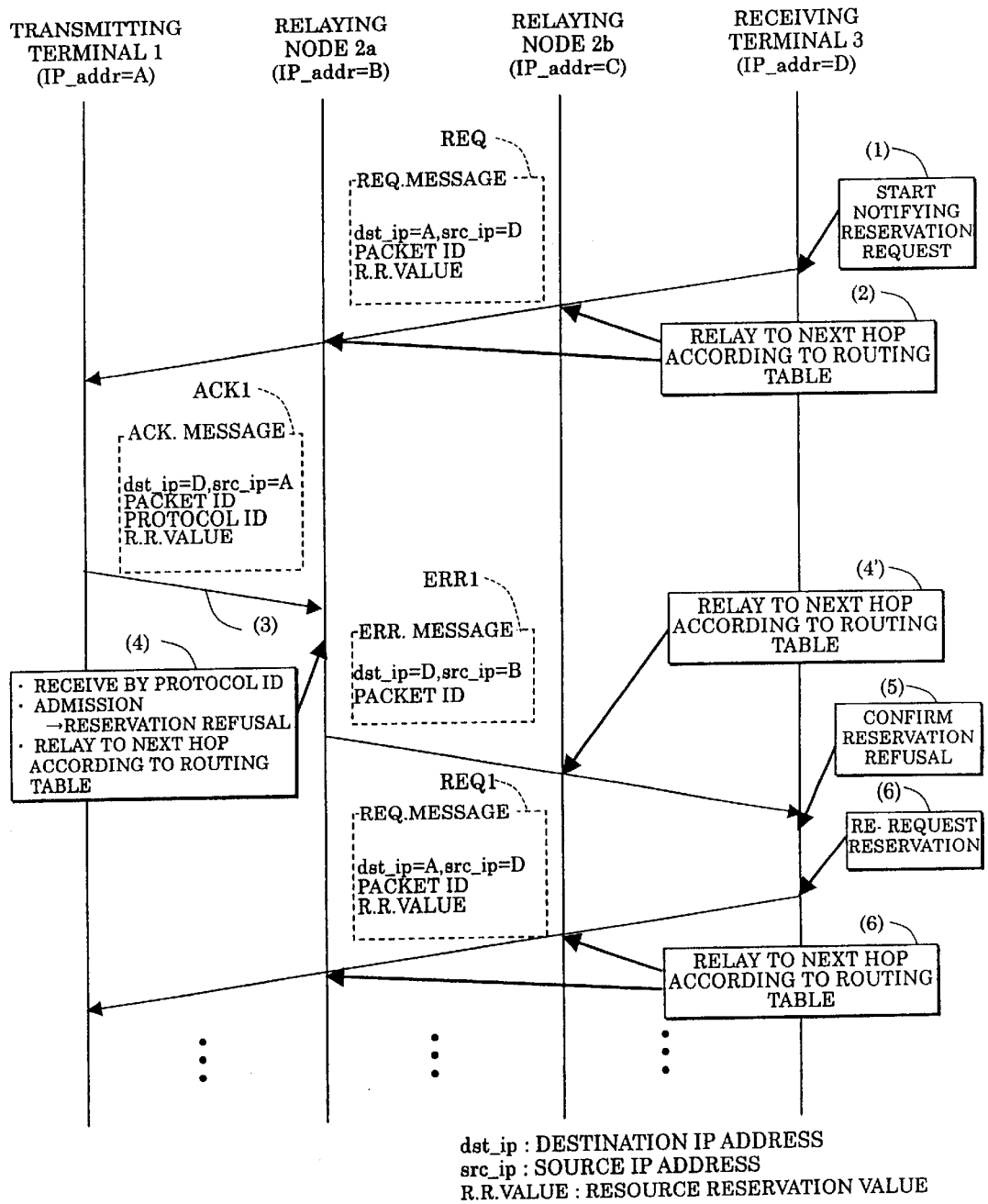
FIG. 17 is a sequence chart of a reservation re-request procedure embodiment in a network system according to the present invention.

[6] Reservation Re-request Procedure Embodiment (1): see FIG. 17

After the reservation request has been refused in the above-mentioned reservation refusal procedure embodiment (1), the reservation of the resources may be requested again in accordance with the following procedures if necessary:

It is assumed that the procedures (1)–(4') in the above-mentioned embodiment (1) are performed, and that in the procedure (4') the reservation request has been refused by the error message ERR1.

(5) The packet receiving terminal 3 recognizes that the reservation request has been refused by receiving an error message ERR2.

(6) The packet receiving terminal 3 generates a request message REQ1 which has stored therein the reservation request value, which is smaller than the resource reservation value as previously requested by using the acknowledgement message; the packet identifier for specifying the packet which is an object of the reservation; and the requested resource reservation value for the packet. Then, the request message REQ1 addressed to the packet transmitting terminal 1 is transmitted, and perform the re-request of the reservation.

Then, the resource reservation procedure is to be repeated.

Figure 18:
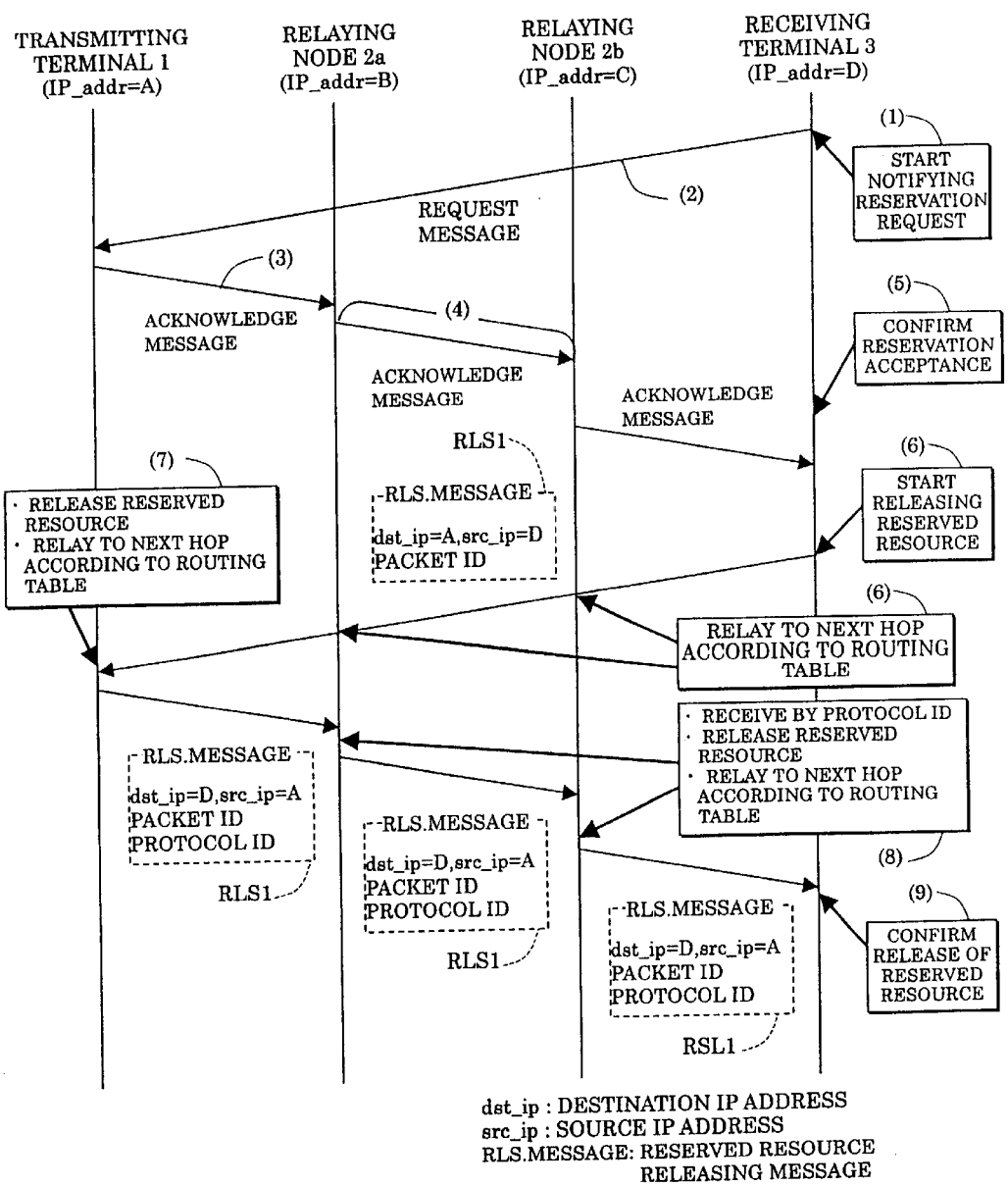
FIG. 18 is a sequence chart of a reservation resource releasing procedure embodiment in a network system according to the present invention.

[7] Reserved Resource Releasing Procedure Embodiment: see FIG. 18

When resources are reserved in the relaying nodes which relay the packet with the reservation request having been accepted in accordance with the above-mentioned resource reservation procedure embodiments (1) and (2) (see FIGS. 11 and 12), the reserved resources may be released by the present embodiment.

The procedures (1)–(4) in the above-mentioned resource reservation procedure embodiments (1) and (2) are performed, and the reservation request is accepted by the procedure (4).

(5) The acknowledgement message ACK3 is received to confirm that the resources have been reserved with the requested reservation value at all the relaying nodes 2a and 2b on the route where the packet is to be relayed.

(6) When the time has elapsed so that the packet receiving terminal 3 tries to release the resources reserved for the packet, the packet receiving terminal 3 transmits a reserved resource releasing message RLS1 addressed to the packet transmitting terminal 1.

(7) The packet transmitting terminal 1 which has received the reserved resource releasing message returns the reserved resource releasing message RLS1 as it is addressed to the packet receiving terminal 3.

(8) The relaying nodes 2a and 2b existing between the receiving terminal 3 and the transmitting terminal 1 check the protocol identifier written in the IP headers of all the packets to be relayed. If the protocol identifier is not an ID of the resource reservation procedure proper to the present invention, an ordinary relaying process is executed according to the IP protocol. If the protocol identifier is the protocol ID proper to the present invention and if the message is the reserved resource releasing message, then the message is received. The packet-related-resources specified by the packet identifier in the message are released. After the release, the reserved resource releasing message RLS1 is transmitted to the packet receiving terminal 3.

(9) The packet receiving terminal 3 receives the reserved resource releasing message RSL1 addressed to itself. As a result, the reserved resources are released at all the relaying nodes 2a and 2b on the route where the packet is to be relayed.

Figure 19:
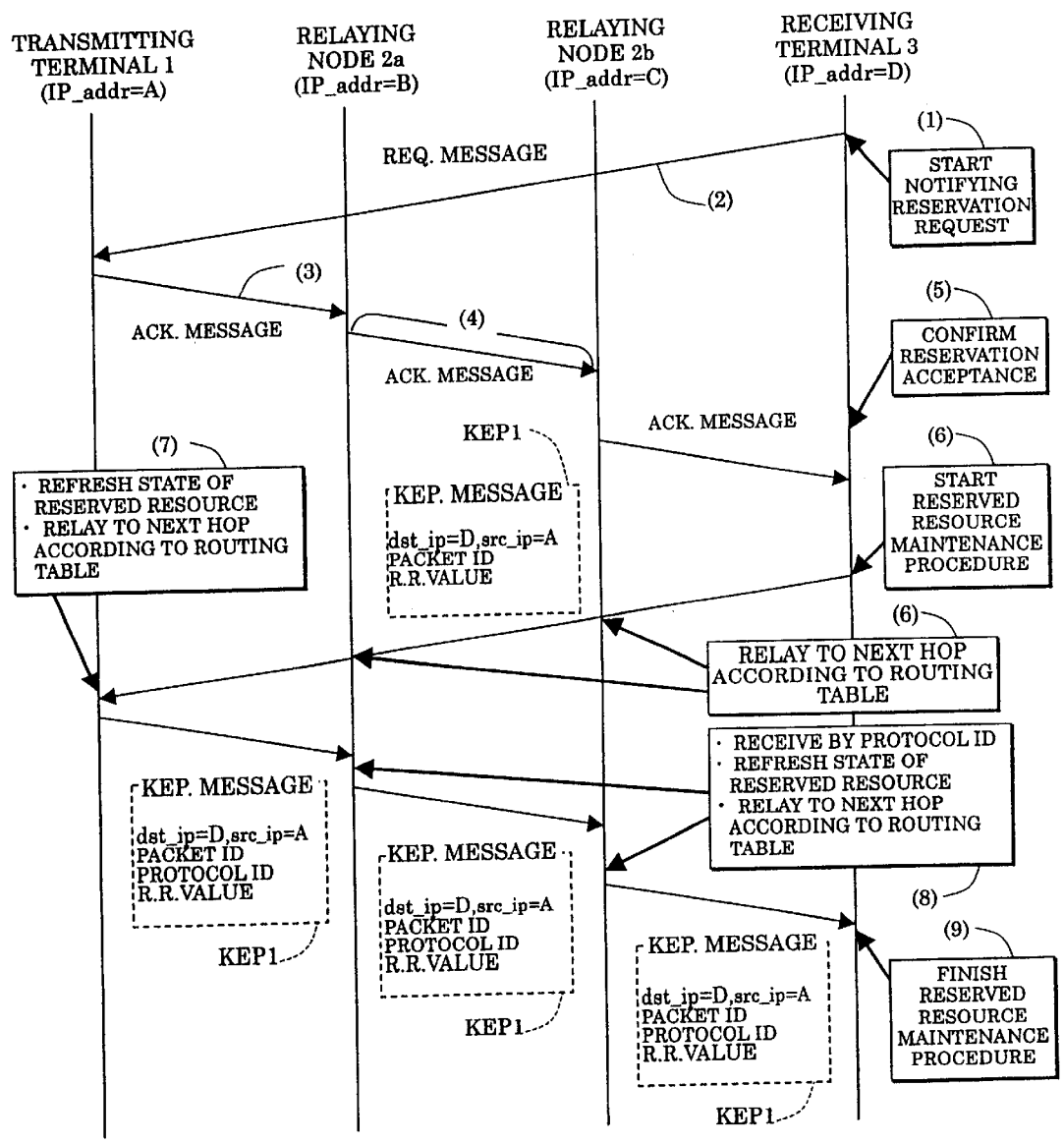
FIG. 19 is a sequence chart of a reservation resource keeping procedure embodiment in a network system according to the present invention.

[8] Reservation Resource Keeping Procedure: see FIG. 19

This is a procedure for keeping (retaining) the reserved resources and when the reservation request is accepted in the above-mentioned resource reservation procedure embodiments (1) and (2) and when the resources are reserved in the relaying nodes which relay the packet.

The procedures (1)–(4) in the above-mentioned resource reservation procedure embodiments (1) and (2) are performed, and the reservation request is accepted by the procedure (4).

(5) The acknowledgement message is received to confirm that the resources have been reserved with the requested reservation value at all the relaying nodes 2a and 2b on the route where the packet is to be relayed.

(6) The packet receiving terminal 3 which desires to reserve resources for the packet transmits at a fixed time interval a reservation keeping message KEP1 addressed to the packet transmitting terminal 1 which requests the packet transmitting terminal 1 to keep the reserved resources. This reservation keeping message KEP1 has stored therein the packet identifier and the resource reservation value.

(7) The packet transmitting terminal 1 which has received the reservation keeping message KEP1 confirms that the reservation request for the packet is currently valid: Refreshing.

While it is confirmed that the reservation is still valid, the message with the same contents as the reservation keeping message KEP1 is transmitted which is received at a fixed time interval, addressed to the receiving terminal 3 according to the routing table.

If the packet receiving terminal 1 does not receive the reservation keeping message KEP1 within a fixed period of time, it discontinues the transmission of the reservation keeping message KEP1 to the packet receiving terminal 3 by judging that the reservation request for the packet is no longer valid.

(8) The relaying nodes 2a and 2b existing between the transmitting terminal 1 and the receiving terminal 3, upon relaying the reservation keeping message KEP1 which is transmitted from the packet transmitting terminal 1 to the packet receiving terminal 3, once receive the reservation keeping message KEP1, and after confirming that the reservation request for the packet which is indicated in the reservation keeping message KEP1 is still valid, the resources for the packet are maintained: Refreshing.

Then, the received reservation keeping message KEP1 is transmitted which is addressed to the packet receiving terminal 3 in accordance with the routing table. Alternatively, while the validity of the reservation is being confirmed, the received reservation keeping message KEP1 received at a fixed time interval is transmitted.

(9) If the packet relaying node does not receive the reservation keeping message KEP1 within a fixed period of time, it releases the reserved resources for the packet and discontinues the transmission of the reservation keeping message KEP1 to the packet receiving terminal 3 by judging that the reservation request for the packet is no longer valid.

It is to be noted that although the reservation keeping message KEP1 is illustratively used as above, the same function as using the reservation keeping message KEP may be fulfilled by using the request message REQ in the direction from the packet receiving terminal 3 to the packet transmitting terminal 1, or by using the acknowledgement message ACK in the directions from the packet transmitting terminal 1 to the relaying nodes 2a and 2b, between the relaying nodes 2a and 2b and from the relaying nodes 2a and 2b to the packet receiving terminal 3.

Figure 20:
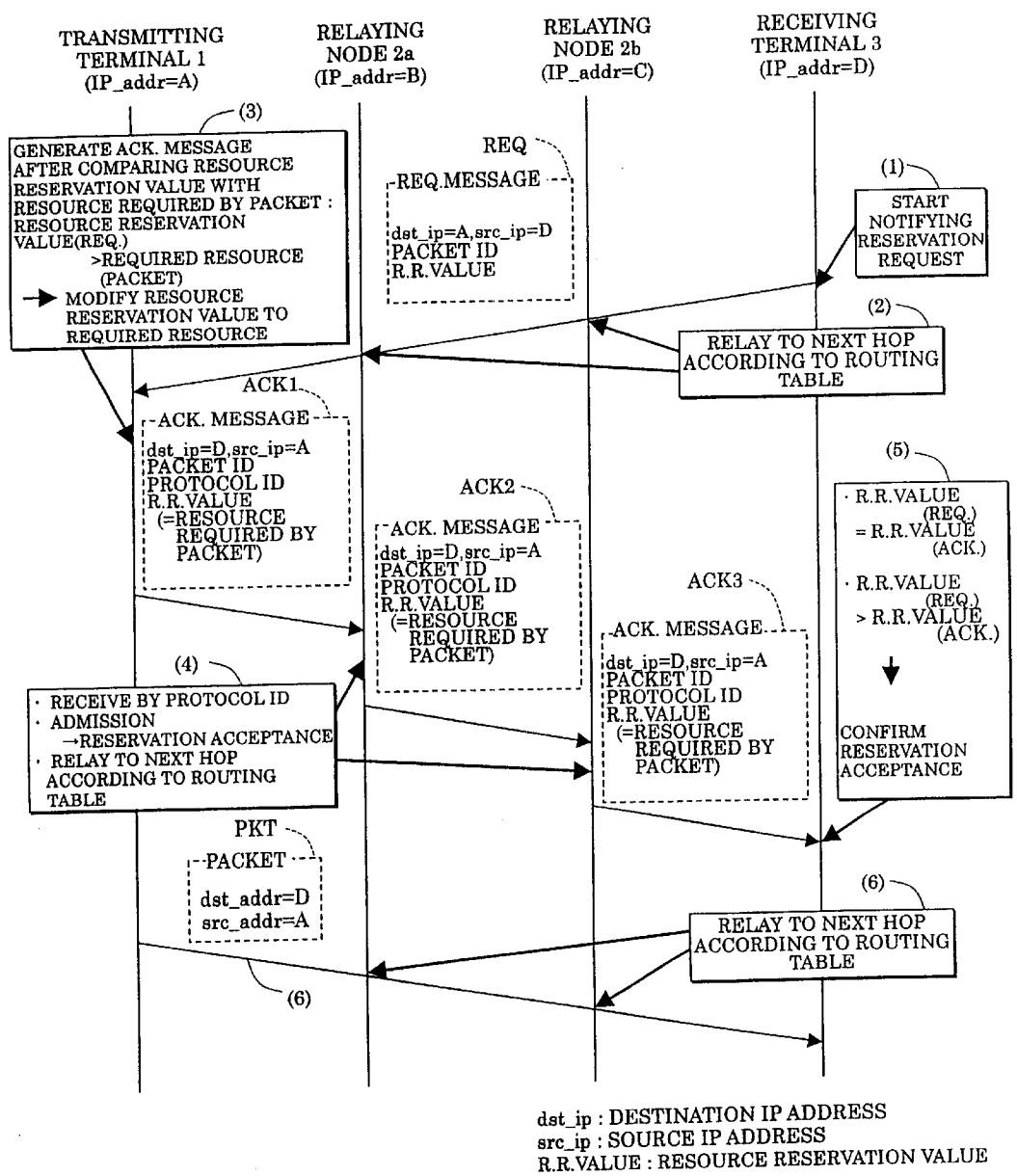
FIG. 20 is a sequence chart of an optimization procedure embodiment (1) of a reservation condition by a transmitting terminal in a network system according to the present invention.
Figure 21:
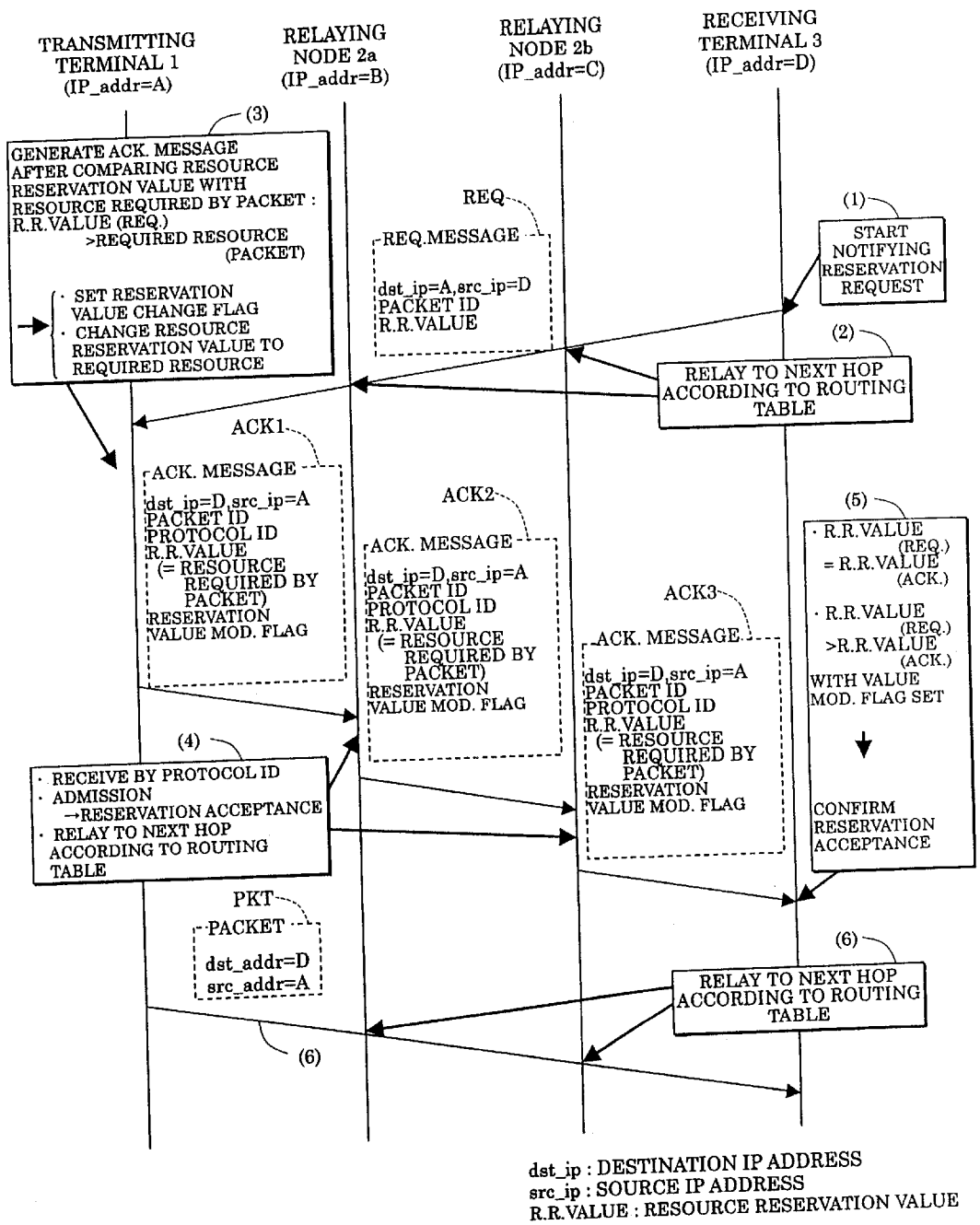
FIG. 21 is a sequence chart of an optimization procedure embodiment (2) of a reservation condition by a transmitting terminal in a network system according to the present invention.

[9] Optimization Procedure Embodiments (1) and (2) of a Reservation Condition by a Transmitting Terminal: see FIGS. 20 and 21

When the packet receiving terminal 3 tries to perform a reservation request, the packet receiving terminal 3 is not aware of the characteristics of the packet as to how much bandwidth the packet requires or how much transfer delay can be allowed.

Therefore, it is possible that the packet receiving terminal 3 requests the reservation for more than the resources for guaranteeing the bandwidth and the delay required by the packet. Accordingly, it is necessary to modify the resources requested by the receiving terminal 3 to an appropriate value according to the packet the packet transmitting terminal 1 transmits.

(1) The packet receiving terminal 3 performing the resource reservation stores the packet identifier for specifying the packet which is an object of the reservation and the requested resources (resource reservation value) for the packet in the request message REQ, which is then transmitted to the packet transmitting terminal 1 by a uni-cast method.

(2) The relaying nodes 2a and 2b existing between the receiving terminal 3 and the transmitting terminal 1 relay the request message REQ in the same way as an ordinary IP packet according to the routing table. Then, the request message REQ is relayed in the form of hop-by-hop to the transmitting terminal 1.

(3) The packet transmitting terminal 1 which has received the request message REQ addressed to itself compares the requested resources within the request message REQ with the resources required by the packet. As a result, if the former is larger than the latter, the latter is deemed to be the resource reservation value.

In this case, it is desirable, as shown in FIG. 21, that the packet transmitting terminal 1 sets a flag (reservation value modification flag) indicating that the requested resources has been modified. In the opposite case, the requested resources notified by the receiving terminal 3 with the requested message REQ is deemed to be the resource reservation value and the reservation value modification flag is preferably reset.

Then, the transmitting terminal 1 transmits the acknowledgement message ACK1 which has stored therein the destination address D of packet as the destination address, the packet identifier, the resource reservation value, and the reservation value modification flag: The same output process as an ordinary IP packet.

(4) The relaying nodes 2a and 2b existing between the transmitting terminal 1 and the receiving terminal 3 check the protocol identifier which is written in the IP headers of all the packets to be relayed. If the acknowledgement message has the protocol identifier which is an ID indicating the resource reservation procedure proper to the present invention, the relaying nodes receive the acknowledgement messages ACK1, 2, determine whether or not the resources can be secured in the relaying nodes with the requested resource reservation value based on the packet identifier and the resource reservation value in the acknowledgement messages ACK1, 2, and determine whether or not to accept the reservation: Admission control as above-mentioned.

As a result of this admission control, the followings are achieved:

If the reservation has been accepted, the resources specified by the resource reservation value, which guarantees the communication quality of packet, is secured in the relaying nodes. Then, the received acknowledgement messages ACK2, 3 are transmitted to the receiving terminal 3 without modification.

If the reservation has been refused, the maximum resources currently available are secured. The resource reservation value of the acknowledgement messages ACK2, 3 are modified to the secured resources. If the reservation value modification flag has been used, after resetting it, the acknowledgement messages ACK2, 3 are transmitted to the receiving terminal 3.

(5) The receiving terminal 3 which has received the acknowledgement message ACK3 addressed to itself compares the requested reservation value in the acknowledgement message ACK3 with the reservation request value in the request message REQ which has been previously transmitted and confirms the following items:

If the former is smaller than the latter and the reservation value modification flag has been reset, the reservation has been refused at one of the relaying nodes on the route where the packet is to be relayed.

If the former is smaller than the latter and the reservation value modification flag has been set, the resources have been reserved with the requested reservation value at all the relaying nodes on the route where the packet is to be relayed.

If the former is equal to or larger than the latter, the resources are reserved with the requested reservation value at all the relaying nodes on the route where the packet is to be relayed.

(6) The packet transmitting terminal 1 transmits the packet PKT to the packet receiving terminal 3 when a fixed period of time has elapsed after transmitting the acknowledgement message ACK1. Then the packet PKT is relayed in the form of hop-by-hop and reaches the receiving terminal 3.

It is to be noted that the packet is relayed with the resources reserved at each node. If the reservation has been refused, the packet is discarded at the relaying nodes or relayed as much as possible.

Figure 22:
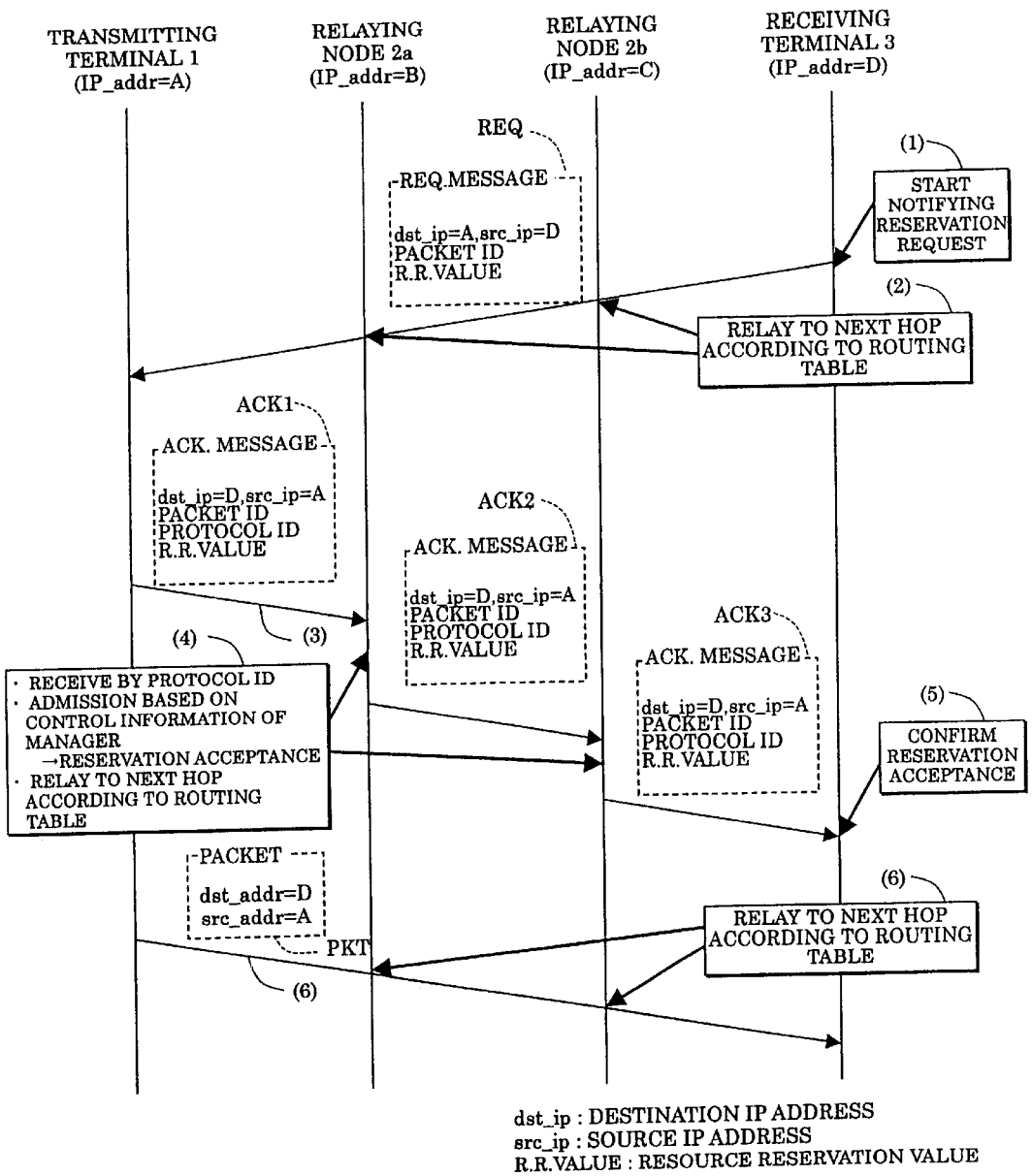
FIG. 22 is a sequence chart of a reservation condition administration procedure embodiment in a network system according to the present invention.

[10] Reservation Condition Controlling Procedure Embodiment by Manager: see FIG. 22

In the procedure (4) of each of the above-mentioned embodiments, when the relaying node decides whether or not to accept the reservation, it may be decided in accordance with a controlling policy set by a network manager.

Moreover, at this time, the reservation cannot be made by the reservation request value which is stored in the acknowledgement message ACK but with a lower value than the requested value in accordance with the management policy set by the network manager. It is to be noted that the sequence of this procedure is similar to that in FIG. 11.

(1) A packet receiving terminal 3 performing the resource reservation stores the packet identifier for specifying the packet which is an object of the reservation and the requested resources (resource reservation value) for the packet in the request message REQ, which is then transmitted to the packet transmitting terminal 1 by a uni-cast method.

(2) The relaying nodes 2a and 2b existing between the receiving terminal 3 and the transmitting terminal 1 relay the request message REQ in the same way as an ordinary IP packet according to a routing table. Then, the request message REQ is relayed in the form of hop-by-hop to the transmitting terminal 1.

(3) The transmitting terminal 1 which has received the request message REQ addressed to itself transmits the acknowledgement message ACK1 which has stored therein the destination address of the packet as the destination address, as well as the packet identifier and the resource reservation value: The same output process as an ordinary IP packet (4) The relaying nodes 2a and 2b existing between the transmitting terminal 1 and the receiving terminal 3 check the protocol identifier which is written in the IP headers of all the packets to be relayed. If the acknowledgement message has the protocol identifier which is an ID indicating the resource reservation procedure proper to the present invention, the relaying nodes receive the acknowledgement messages ACK1, 2, determine whether or not the resources can be secured in the relaying nodes with the requested resource reservation value based on the packet identifier and the resource reservation value in the acknowledgement messages ACK1, 2, and determine whether or not to accept the reservation: Admission control as above-mentioned.

However, this admission control can determine whether or not to accept the reservation not only by the resource within the relaying nodes but also by the instructions of the network manager.

For instance, conditions such as not to refuse the reservation for a packet which has the address A as a transmission source or to enable the allocation of bandwidth up to 10 Mbps for a packet which has the address B as a destination may be additionally considered to determine whether or not to accept the reservation.

As a result of the above-mentioned admission control, the followings are achieved:

If the reservation has been accepted, the resources which guarantee the communication quality of packet are secured in the relaying node. Then, the received acknowledgement messages ACK1, 2 are transmitted toward the receiving terminal 3 as the acknowledgement message ACK2, 3 without modification.

If the reservation request performing the resource reservation meeting the reservation request value has not been accepted, but a reservation of resources lower than the value has been accepted, only the accepted resources are secured within the relaying nodes. Then, the received acknowledgement messages ACK1 and 2 have the reservation request value modified and transmitted to the receiving terminal 3 as the acknowledgement messages ACK2, 3.

If the reservation has been refused, an error message which stores the packet identifier is transmitted toward the packet receiving terminal 3.

(5) The packet receiving terminal 3 receives the acknowledgement message ACK3 addressed to itself, and confirms that the resources have been reserved with the requested resource reservation value at all the relaying nodes 2a and 2b on the route where the packet is to be relayed, or with the resource request value that the network manager has permitted for the packet.

(6) The packet transmitting terminal 1 transmits the packet PKT to the packet receiving terminal 3 when a fixed period of time has elapsed after transmitting the acknowledgement message ACK1. Then the packet PKT is relayed in the form of hop-by-hop and reaches the receiving terminal 3.

Figure 23:
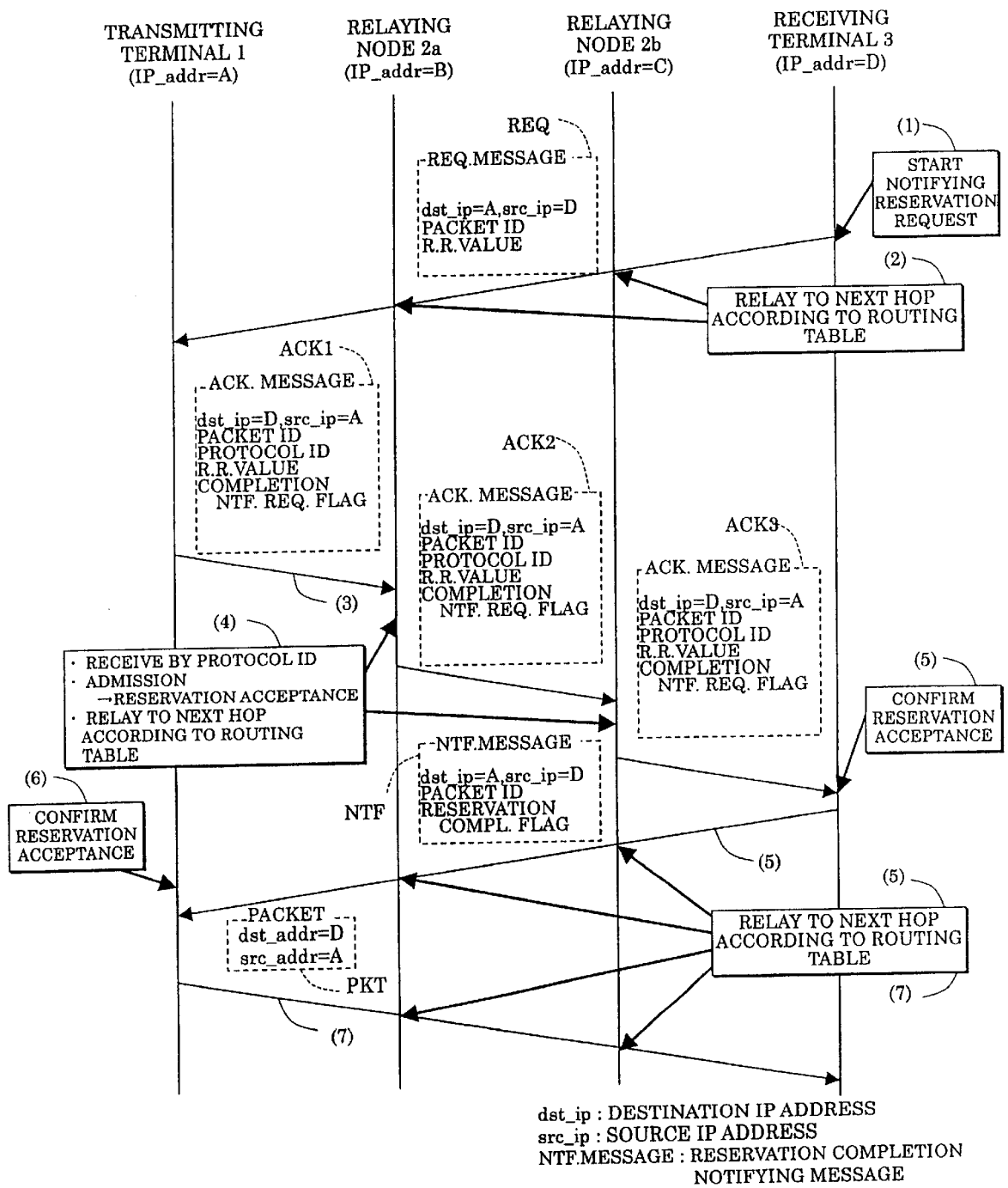
FIG. 23 is a sequence chart of a reservation completion notification to transmitting terminal procedure embodiment of a network system according to the present invention.
Figure 24:
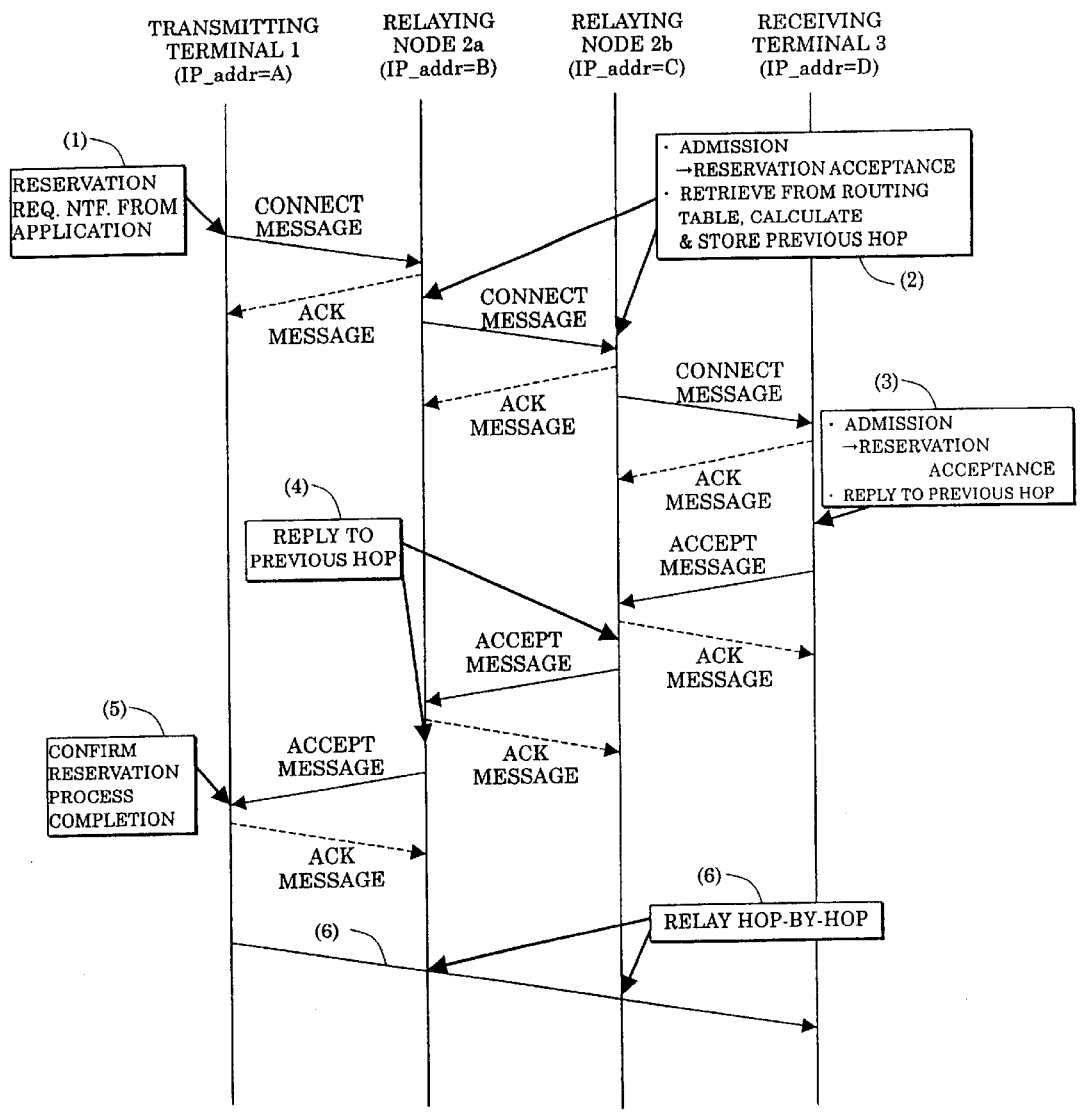
FIG. 24 is a sequence chart of a resource reservation procedure in the prior art.

[11] Reservation Completion Notification Procedure Embodiment to the Transmitting Terminal: see FIG. 23

Since in the above-mentioned embodiments it is the packet receiving terminal 3 that mainly performs the reservation, only the reservation terminal 3 can confirm whether or not the reservation procedure has completed.

However, depending on the application, there are cases where not only the receiving terminal 3 but also the transmitting terminal 1 need to know the completion of the reservation procedure.

Therefore, with the following procedures the confirmation by both the receiving terminal 3 and the transmitting terminal 1 becomes possible.

The reservation is now performed in accordance with the resource reservation procedure embodiment (1) (see FIG. 11). As a result, the procedure for notifying the transmitter of the acceptance of the reservation is described as follows:

(1) The packet receiving terminal 3 performing the resource reservation stores the packet identifier for specifying the packet which is an object of the reservation and the requested resources (resource reservation value) for the packet in the request message REQ, which is then transmitted to the packet transmitting terminal 1 by a uni-cast method.

(2) The relaying nodes 2a and 2b existing between the receiving terminal 3 and the transmitting terminal 1 relay the request message REQ in the same way as an ordinary IP packet according to the routing table. Then, the request message REQ is relayed in the form of hop-by-hop to the transmitting terminal 1.

(3) The transmitting terminal 1 which has received the request message REQ addressed to itself transmits an acknowledgement message ACK1 which has stored therein the destination address D of the packet as the destination address of the terminal 3, the packet identifier, and the resource reservation value. At this time, if necessary, the packet transmitting terminal 1 may request the packet receiving terminal 3 to notify whether or not the reservation request has been completed. When requesting the notification, the completion notification request flag is set and the acknowledgement messages ACK2, 3 are transmitted.

(4) The relaying nodes 2a and 2b existing between the transmitting terminal 1 and the receiving terminal 3 check the protocol identifier which is written in the IP headers of all the packets to be relayed. If the acknowledgement message has the protocol identifier which is an ID indicating the resource reservation procedure proper to the present invention, the relaying nodes receive the acknowledgement messages ACK1, 2, determine whether or not the resources can be secured in the relaying nodes with the requested resource reservation value based on the packet identifier and the resource reservation value in the acknowledgement messages ACK1, 2, and determine whether or not to accept the reservation: Admission control as above-mentioned.

As a result of this admission control, if the reservation has been accepted, the resources which guarantee the communication quality of packet are secured in the relaying node. Then, the received acknowledgement messages ACK1, 2 are transmitted without any change towards the receiving terminal 3 as the acknowledgement message ACK2, 3: The same output process of an ordinary IP packet.

(5) The packet receiving terminal 3 receives, the acknowledgement message ACK3 addressed to itself, and confirms that the resources have been reserved with the requested resource reservation value at all the relaying nodes on the route where the packet is to be relayed.

If the completion notice requesting flag has been set in the acknowledgement message ACK3, a reservation completion notifying message NTF in which the reservation completion flag is set is transmitted by the packet receiving terminal 3.

(6) The packet transmitting terminal 1 is able to confirm that the reservation procedure previously performed by the acknowledgement message has been completed by receiving the reservation completion notifying message NTF in which the reservation completion flag is set.

(7) The packet transmitting terminal 1 transmits the packet PKT to the packet receiving terminal 3 after receiving the reservation completion notification message NTF. Then, packet PKT is relayed in the form of hop-by-hop, and reaches the receiving terminal 3.

It is to be noted that although the reservation completion notification message NTF is illustratively used as in the above, the same function may be fulfilled by using the request keeping message KEP1 which is transmitted from the packet receiving terminal 3 to the packet transmitting terminal 1 in order to keep the reserved message, or by introducing in the request message REQ a flag (reservation completion flag) indicating that the reservation procedure has been completed and setting this flag when the message is transmitted.

As described above, it is arranged in a network system according to the present invention so that a packet receiving terminal transmits to a packet transmitting terminal a request message in which a reservation request condition is stored in order to request a resource reservation for the packet, the packet transmitting terminal having received the request message transmits to the relaying nodes on the same route as the packet an acknowledgement message in which the reservation request condition is stored, each relaying node provides a resource reservation for the home relaying node according to the reservation request condition in the acknowledgement message and transfers the acknowledgement message to the same route as the packet, and after the acknowledgement message has passed through all the relaying nodes which relay the packet, when the packet receiving terminal has received the acknowledgement message, a network resource reservation procedure is completed. Therefore, the resource reservation at the relaying nodes may be performed from the side of the terminal which receives the packet so that it becomes possible to download files on a server using FTP protocol or for a subscriber of a video-on-demand system to request watching a desired TV program having a reproduction quality maintained at a certain level.

What we claim is:

1. A network system comprising;
   terminals and relaying nodes each having a reservation message processing unit for transferring a packet wherein;
   the reservation message processing unit of a packet receiving terminal transmits to a packet transmitting terminal a request message in which a reservation request condition is stored in order to request a resource reservation for the packet;
   the reservation message processing unit of the packet transmitting terminal having received the request message transmits to the relaying nodes on the same route as the packet an acknowledgement message in which the reservation request condition is stored responsive to the request message;
   the reservation message processing unit of each relaying node provides a resource reservation for the relaying node itself according to the reservation request condition in the acknowledgement message instead of the request message and transfers the acknowledgement message to the same route as the packet; and
   after the acknowledgement message has passed through all the relaying nodes which relay the packet and then the reservation message processing unit of the packet receiving terminal has received the acknowledgement message, a network resource reservation procedure is completed.

2. A network system as claimed in claim 1 wherein the acknowledgement message stores an address of the packet receiving terminal and a protocol identifier which specifies a protocol indicating a resource reservation procedure, the packet transmitting terminal and the relaying nodes respectively maintain in their reservation message processing units a routing table for transmitting the acknowledgement message to the same route as the packet, and the reservation message processing unit of each relaying node checks the protocol identifier to determine whether or not to receive the acknowledgement message.

3. A network system as claimed in claim 1 wherein the acknowledgement message stores an address of the packet receiving terminal and an address of a subsequent relaying node which is retrieved by using the address of the packet receiving terminal as a key from a routing table for transmitting the acknowledgement message to the same route as the packet, the packet transmitting terminal and the relaying nodes respectively maintains the routing table in their reservation message processing units, and the reservation message processing unit of each relaying node checks if the address in the acknowledgement message is a home address to determine whether or not to receive the acknowledgement message.

4. A network system as claimed in claim 1 wherein each relaying node has a reservation acceptance determining unit which determines whether or not to accept the reservation request condition in the acknowledgement message, and the reservation message processing unit transfers the acknowledgement message if the condition should be accepted, while transmitting an error message notifying an error to the packet receiving terminal if not.

5. A network system as claimed in claim 4 wherein the reservation message processing unit of the packet receiving terminal, having confirmed by receiving the error message that the reservation request has not been accepted, modifies the reservation request condition and resends the request reservation.

6. A network system as claimed in claim 1 wherein each relaying node has a reservation acceptance determining unit which determines whether or not to accept the reservation request condition in the acknowledgement message, and the reservation message processing unit transfers the acknowledgement message if the condition should be accepted, while providing the resource reservation with an allowable condition for each relaying node to accept the reservation and transfers the acknowledgement message which has the reservation request condition modified to the accepted condition if not.

7. A network system as claimed in claim 6 wherein a flag is provided in the acknowledgement message to indicate that the reservation request condition has been modified, the flag is set when the reservation message processing unit of each relaying node modifies the reservation request condition in the acknowledgement message, and by checking the flag the reservation message processing unit of the packet receiving terminal confirms whether or not the reservation request has been accepted by each relaying node.

8. A network system as claimed in claim 6 wherein the reservation message processing unit of the packet receiving terminal compares the requested reservation request condition with the reservation request condition stored in the acknowledgement message and confirms, depending on the compared result, whether or not the reservation request has been accepted by each relaying node.

9. A network system as claimed in claim 1 wherein in order to release the reserved resource within each relaying node, a reserved resource releasing message is sent in at least one of the following directions:
   from the packet receiving terminal to the packet transmitting terminal;
   from the packet transmitting terminal to the relaying nodes;
   between the relaying nodes; and
   from the relaying nodes to the packet receiving terminal.

10. A network system as claimed in claim 1 wherein in order to maintain the resource within each relaying node, a reservation keeping message is transmitted periodically in at least one of the following directions:
    from the packet receiving terminal to the packet transmitting terminal;
    from the packet transmitting terminal to the relaying nodes;

between the relaying nodes; and from the relaying nodes to the packet receiving terminal, and if the resource reservation keeping message has not been received for more than a fixed period of time, the resource is released and the periodical transmission of the resource reservation keeping message is discontinued.

11. A network system as claimed in claim 1 wherein the reservation message processing unit of the packet transmitting terminal compares a resource specified in the reservation request condition within the received request message and a resource required by the packet to be reserved, and if the former is larger than the latter, transmits the acknowledgement message after the reservation request condition having been modified.

12. A network system as claimed in claim 11 wherein a flag is provided in the acknowledgement message to indicate that the reservation condition has been modified, the flag is set when the reservation message processing unit of the packet transmitting terminal modifies the reservation condition in the acknowledgement message, and by checking the flag the packet receiving terminal confirms whether or not the reservation request condition has been modified by the packet transmitting terminal to the resource required by the packet.

13. A network system as claimed in claim 1 wherein the reservation message processing units of the packet transmitting terminal and the relaying nodes preliminarily modify the reservation condition in the received message according to control information on resource reservation made by at least one of a network manager and a relaying node manager.

14. A network system as claimed in claim 1 wherein a flag is provided in the acknowledgement message in order for the packet receiving terminal to notify the completion of a reservation procedure to the packet transmitting terminal, the reservation message processing unit of the packet transmitting terminal sets the flag upon transmitting the acknowledgement message, and the reservation message processing unit of the packet receiving terminal which has received the acknowledgement message with the flag set notifies the completion of a reservation procedure to the packet transmitting terminal through a reservation completion notifying message.

15. A packet transmitting terminal handling packets which have stored therein reservation request conditions for resource reservation wherein;

the packet transmitting terminal which has received a request message which has stored therein the reservation request conditions for resource reservation requested by a packet receiving terminal performs routing an acknowledgement message which has stored therein the reservation request condition responsive to the request message to a relaying node, providing a resource reservation upon receiving the acknowledgement message, by a reservation message processing unit of the packet transmitting terminal.

16. A relaying node handling packets which have stored therein reservation request conditions wherein;

the relaying node which has received from a packet transmitting terminal an acknowledgement message which has stored therein the reservation request conditions for resource reservation requested by a packet receiving terminal provides a resource reservation for the relaying node itself according to the reservation request condition in the acknowledgement message and performs routing the acknowledgement message to another relaying node or to the packet receiving terminal by a reservation message processing unit of the relaying node.

17. A packet receiving terminal handling packets which have stored therein reservation request conditions wherein;

the packet receiving terminal which has received from a relaying node an acknowledgement message transmitted by a packet transmitting terminal which have stored therein the reservation request conditions requested by the packet receiving terminal and relayed by a relaying node, having provided a resource reservation upon receiving the acknowledgement message, completes a resource reservation procedure with the packet transmitting terminal.

\* \* \* \* \*